US012808785B2

(12) United States Patent
Hu

(10) Patent No.: US 12,808,785 B2
(45) **Date of Patent: *Nov. 24, 2026**

(54) SURFACE PLASMON RESONANCE SENSOR COMPRISING METAL COATED NANOSTRUCTURES AND A MOLECULARLY IMPRINTED POLYMER LAYER

(71) Applicant: DrinkSavvy, Inc., Brooklyn, NY (US)

(72) Inventor: Min Hu, Brooklyn, NY (US)

(73) Assignee: Chemeleon, Inc., Brooklyn, NY (US)

( * ) Notice: Subject to any disclaimer, the term of this patent is extended or adjusted under 35 U.S.C. 154(b) by 129 days.

This patent is subject to a terminal disclaimer.

(21) Appl. No.: 18/801,603

(22) Filed: Aug. 12, 2024

(65) Prior Publication Data

US 2024/0402075 A1 Dec. 5, 2024

Related U.S. Application Data

(60) Continuation of application No. 17/671,383, filed on Feb. 14, 2022, now Pat. No. 12,140,529, which is a
(Continued)

(51) Int. Cl.
*G01N 21/25* (2006.01)
*B01J 20/26* (2006.01)
(Continued)

(52) U.S. Cl.
CPC .......... *G01N 21/251* (2013.01); *B01J 20/268* (2013.01); *B01J 20/3057* (2013.01);
(Continued)

(58) Field of Classification Search
CPC .... G01N 21/78; G01N 21/783; G01N 21/554; G01N 21/251; G01N 2021/7773;
(Continued)

(56) References Cited

U.S. PATENT DOCUMENTS 8,339,597 B2 12/2012 Dal Negro et al.
8,673,237 B2 3/2014 Schalkhammer
(Continued)

FOREIGN PATENT DOCUMENTS

AT 508710 B1 6/2011
AU 2005246415 B8 * 9/2011 .......... G01N 21/658
(Continued)

OTHER PUBLICATIONS

Dechtrirat, Decha et al., “Hybrid Material for Protein Sensing Based on Electrosynthesized MIP on a Mannose Terminated Self-Assembled Monolayer”, Advanced Functional Materials, vol. 24, No. 15, Apr. 1, 2014 (pp. 2233-2239).
(Continued)

*Primary Examiner* — Michael P Stafira
(74) *Attorney, Agent, or Firm* — Michael T. Abramson; Jordan IP Law, LLC

(57) ABSTRACT

A colorimetric sensor for detecting an analyte of interest that includes a metal layer disposed upon a substrate, a plurality of nanostructures, and a corresponding plurality of metal deposits spaced apart from the metal layer. The metal layer defines a plurality of holes, each nanostructure includes a first portion disposed within a respective hole, and each metal deposit is disposed upon a second portion of a respective nanostructure. The sensor also includes a molecularly imprinted polymer layer that may cover the metal layer, the nanostructures, and/or the metal deposits. The molecularly imprinted polymer layer defines a cavity shaped to receive the analyte of interest, and the sensor is configured such that, when an analyte contacts the molecularly imprinted polymer layer and becomes disposed within the cavity, an optical property of at least a portion of the sensor changes thereby to cause a detectable color change in and/or from the sensor.

25 Claims, 12 Drawing Sheets

Related U.S. Application Data division of application No. 16/427,039, filed on May 30, 2019, now Pat. No. 11,280,723, which is a continuation of application No. PCT/US2017/065333, filed on Dec. 8, 2017.

(60) Provisional application No. 62/489,668, filed on Apr. 25, 2017, provisional application No. 62/431,585, filed on Dec. 8, 2016.

(51) Int. Cl.

| | |
|---|---|
| ***B01J 20/30*** | (2006.01) |
| ***B01J 20/32*** | (2006.01) |
| ***G01N 21/552*** | (2014.01) |
| ***G01N 21/77*** | (2006.01) |
| *B82Y 30/00* | (2011.01) |
| *B82Y 40/00* | (2011.01) |

(52) U.S. Cl.

CPC ........ *B01J 20/3204* (2013.01); *G01N 21/554* (2013.01); *G01N 21/77* (2013.01); *B82Y 30/00* (2013.01); *B82Y 40/00* (2013.01); *G01N 2021/258* (2013.01); *G01N 2021/7773* (2013.01)

(58) Field of Classification Search

CPC ........... G01N 2021/258; G01N 21/648; G01N 21/77; G01N 31/22; G01N 2021/7723; G01N 31/224; G01N 33/52; G01N 21/658; G01N 21/81; G01N 33/54373; G01N 21/41; G01N 21/45; G01N 21/65; G01N 33/14; G01N 33/0057; G01N 33/587; G01N 31/223; G01N 33/521; G01N 2021/7783; G01N 2333/01; G01N 31/227; G01N 33/0009; G01N 33/227; G01N 2021/7786; G01N 21/80; G01N 33/0044; G01N 33/532; G01N 33/56983; G01N 2021/7793; G01N 21/31; G01N 21/7743; G01N 27/127; G01N 31/10; G01N 33/005; G01N 33/1813; G01N 33/1893; G01N 33/497; G01N 33/569; G01N 2021/757; G01N 2021/7769; G01N 21/00; G01N 21/255; G01N 21/27; G01N 21/29; G01N 21/4133; G01N 21/4788; G01N 21/552; G01N 21/553; G01N 2201/08; G01N 2333/11; G01N 2333/165; G01N 2333/195; G01N 2333/916; G01N 2333/918; G01N 2333/924; G01N 2405/06; G01N 2405/10; G01N 2458/30; G01N 27/304; G01N 27/4146; G01N 2800/06; G01N 31/221; G01N 33/12; G01N 33/5076; G01N 33/543; G01N 33/54313; G01N 33/5432; G01N 33/54366; G01N 33/552; G01N 33/56911; G01N 33/583; G01N 33/586; G01N 33/689; G01N 33/74; G01N 2021/1776; G01N 21/25; G01N 21/293; G01N 21/47; G01N 27/126; G01N 27/129; G01N 33/0027; G01N 33/5308; G01N 33/54306; G01N 33/54386; G01N 33/585; G01N 33/66; B01J 20/268; B01J 20/3057; B01J 20/3204; B01J 2220/49; B01J 13/22; B01J 13/02; B01J 31/1691; B01J 23/42; B01J 23/44; B01J 23/462; B01J 23/464; B01J 23/468; B82Y 30/00; B82Y 40/00; B82Y 15/00; B82Y 20/00

See application file for complete search history.

(56) References Cited

U.S. PATENT DOCUMENTS

| | | | | |
|---|---|---|---|---|
| 9,464,985 | B2 * | 10/2016 | Liu | G01N 21/554 |
| 9,676,621 | B2 * | 6/2017 | Chen | G01N 27/4145 |
| 10,520,441 | B2 * | 12/2019 | Li | G01N 21/658 |
| 2006/0034729 | A1 * | 2/2006 | Poponin | G02B 5/204 422/82.05 |
| 2009/0298712 | A1 * | 12/2009 | Kiryukhin | B01J 13/22 506/13 |
| 2011/0050431 | A1 | 3/2011 | Hood et al. | |
| 2011/0205543 | A1 | 8/2011 | Offermans et al. | |
| 2016/0025635 | A1 * | 1/2016 | Li | G01N 27/04 29/458 |
| 2016/0140994 | A1 * | 5/2016 | Chen | G11B 5/855 216/37 |
| 2017/0160205 | A1 | 6/2017 | Lee et al. | |
| 2018/0003706 | A1 | 1/2018 | Trenholm et al. | |
| 2020/0141871 | A1 * | 5/2020 | Chang | G01N 33/587 |

FOREIGN PATENT DOCUMENTS

| | | | | | |
|---|---|---|---|---|---|
| AU | 2013246359 | B2 * | 3/2017 | G01N 21/554 |
| EP | 2761269 | B1 * | 11/2016 | G01N 21/648 |
| KR | 101255752 | B1 * | 4/2013 | G01N 21/553 |
| WO | WO-2008045596 | A2 * | 4/2008 | B82Y 15/00 |
| WO | 2010088585 | A1 | 8/2010 | |
| WO | WO-2011017726 | A1 * | 2/2011 | G01N 33/587 |
| WO | WO-2011109473 | A1 * | 9/2011 | B01J 20/324 |
| WO | WO-2011136548 | A2 * | 11/2011 | H10P 76/2041 |
| WO | 2012054121 | A2 | 4/2012 | |
| WO | WO-2013048446 | A1 * | 4/2013 | G01N 21/648 |
| WO | 2013154770 | A1 | 10/2013 | |
| WO | 2013170377 | A1 | 11/2013 | |
| WO | WO-2015157691 | A1 * | 10/2015 | G01N 33/28 |
| WO | WO-2016025430 | A1 * | 2/2016 | A61B 5/1468 |
| WO | WO-2018107038 | A1 * | 6/2018 | G01N 21/554 |

OTHER PUBLICATIONS

Hu, Jonathan et al., "Effects of nanodots on surface plasmons and electric field enhancement in nano-pillar antenna array", Conference on Lasers and Electro-optics (CLEO) and Quantum Electronics and Laser Science Conference (QELS), May 16, 2010, 2 pages.

James, Timothy D. et al., "The Plasmonic Pixel: Large Area, Wide Gamut Color Reproduction Using Aluminum Nanostructures", Nano Letters 2016, 16, pp. 3817-3823.

Li, Wen-Di et al., "Three-dimensional cavity nanoantenna coupled plasmonic nanadots for ultrahigh and uniform surface-enhanced Raman scattering over large area", Optics Express, Feb. 28, 2011, vol. 19, No. 5, pp. 3925-3936.

Miyata, Masashi et al., "Full-Color Subwavelength Printing with Gap-Plasmonic Optical Antennas", Nano Letters 2016, 16, pp. 3166-3172.

Sharma, Piyush Sindhu et al., "Surface development of molecularly imprinted polymer films to enhance sensing signals", Trends in Analytical Chemistry, vol. 51, Nov. 1, 2013, pp. 146-157.

Tan, Shawn J. et al., "Plasmonic Color Palettes for Photorealistic Printing with Aluminum Nanostructures", Nano Letters 2014, 14, pp. 4023-4029.

Tokareva, Iryna et al., "Ultrathin molecularly imprinted polymer sensors employing enhanced transmission surface plasmon resonance spectroscopy" The Royal Society of Chemistry Chem. Commun., (accepted Jun. 20, 2006; published online Jun. 30, 2006), pp. 3343-3345.

Tokonami, Shiho et al., "Review: Micro- and nanosized molecularly imprinted polymers for highthroughput analytical applications", Analytica Chimica Acta, vol. 641, 2009, pp. 7-13.

(56) References Cited

OTHER PUBLICATIONS

Wang, Yifei et al., "Strain-tunable plasmonic crystal using elevated nanodisks with polarization-dependent characteristics", Applied Physics Letters 108, 071110, (Received Nov. 19, 2015; accepted Feb. 9, 2016; published online Feb. 19, 2016), 5 pages.
Non-Final Office Action for U.S. Appl. No. 17/671,383 dated Dec. 8, 2023, 8 pages.
Notice of Allowance for U.S. Appl. No. 17/671,383 dated May 8, 2024, 9 pages.
Corrected Notice of Allowability for U.S. Appl. No. 17/671,383 dated Aug. 5, 2024, 35 pages.
Corrected Notice of Allowability for U.S. Appl. No. 17/671,383 dated Sep. 12, 2024, 42 pages.
Corrected Notice of Allowability for U.S. Appl. No. 17/671,383 dated Sep. 25, 2024, 42 pages.
Non-Final Office Action for U.S. Appl. No. 16/427,039 dated Apr. 12, 2021, 15 pages.
Notice of Allowance for U.S. Appl. No. 16/427,039 dated Nov. 10, 2021, 8 pages.
Corrected Notice of Allowability for U.S. Appl. No. 16/427,039 dated Jan. 27, 2022, 4 pages.
International Search Report for International Application No. PCT/US2017/065333, mailed May 23, 2018 (6 pages).
Written Opinion for International Application No. PCT/US2017/065333, mailed May 23, 2018 (9 pages).
Australian Examination Report No. 1 for Australian Patent Application No. 2017374052, dated Nov. 5, 2021 (3 pages).
Australian Notice of Acceptance for Australian Patent Application No. 2017374052, dated Oct. 18, 2022 (3 pages).
European Examination Report for European Patent Application No. 17826019.6, dated Nov. 16, 2021 (7 pages).

* cited by examiner

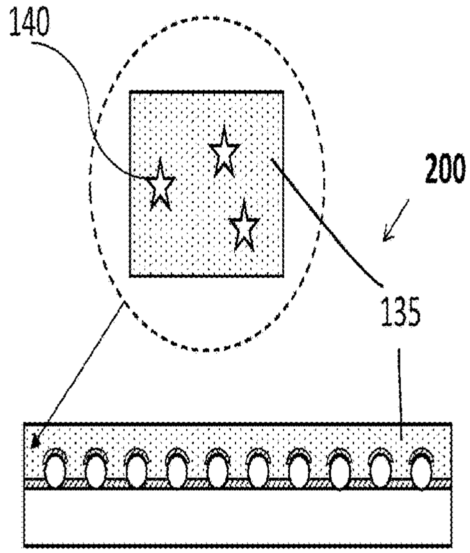
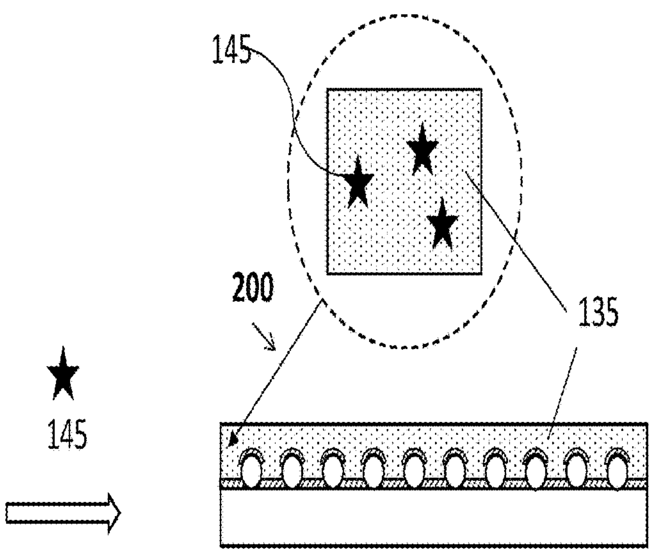
FIGURE 4A
FIGURE 4B 94
96
Imprint
98

90

92

25

30
35

50
100

SURFACE PLASMON RESONANCE SENSOR COMPRISING METAL COATED NANOSTRUCTURES AND A MOLECULARLY IMPRINTED POLYMER LAYER

CROSS-REFERENCE TO RELATED APPLICATIONS

This application is a continuation of U.S. patent application Ser. No. 17/671,383, filed on Feb. 14, 2022, which is a divisional of U.S. patent application Ser. No. 16/427,039 filed on May 30, 2019 and is now granted U.S. Pat. No. 11,280,723, which is a continuation of International Patent Application No. PCT/US2017/065333, filed on Dec. 8, 2017, which claims the benefit of U.S. Provisional Application No. 62/489,668, filed on Apr. 25, 2017, and U.S. Provisional Patent Application No. 62/431,585, filed on Dec. 8, 2016, the contents of which are all incorporated by reference.

TECHNICAL FIELD

In various embodiments, the present invention relates to a colorimetric sensor for use in detecting the presence of a target molecule (analyte) in a fluid sample and, more specifically, to sub-wavelength nanostructured color pixel arrays and plasmonic colorimetric sensors for use in detecting the presence of a target molecule in a fluid sample.

BACKGROUND OF THE INVENTION

The use of agents to incapacitate an individual has become more prevalent. Examples of such agents include gamma-butyrolactone (GBL), gamma-hydroxybutyrate (GHB), ketamine, Rohypnol, and the like. For example, the agents may be secretly placed in a beverage, such as an alcoholic beverage, of the intended consumer. Because these and similar agents are colorless, substantially odorless, and hard to detect, methods and devices are needed to detect the presence of such agents prior to consumption.

Although there are various techniques for detecting the presence of a chemical substance in a subject after the subject has consumed such an agent (e.g., by urinalysis using liquid chromatography-tandem mass spectrometry), such techniques are reactive in nature and merely confirm what may already be suspected, rather than proactive to detect the agent before it has been consumed. Furthermore, such techniques require expensive equipment run by highly trained technicians. Proactive testing devices may require exposing a portion of the liquid to be tested to a chemical reagent composition, which may result in a color change that indicates the presence of the agent in the liquid sample. Unfortunately, such tests are time consuming and may not be discrete.

Additional testing apparatuses are available. For example, a subject may use drug testing strips that are hidden in or incorporated into, for example, a match, a match book, a cocktail napkin, a coaster, a placemat, a menu, and so forth. Although such approaches may appear more discreet, the subject may nevertheless be placed in an awkward position by having to perform the test. Moreover, the subject may have to carry out tests periodically over the course of a social encounter.

U.S. Pat. No. 9,285,352 describes an apparatus for testing a liquid using a straw, a stirrer, and/or a beverage container, where an indicator adapted to provide a visible reaction, e.g., a color change, upon exposure to an agent of interest, is adhered or otherwise bonded to a portion of the straw, stirrer, and/or beverage container. In particular, the indicator may cause the straw, stirrer, and/or beverage container, or the liquid contacting the straw, stirrer, and/or beverage container, to change color and/or fluoresce when an agent of interest is detected at or above a certain concentration.

Despite the advances made to date, there still exists a need for improved devices (e.g., colorimetric sensors) and methods for detecting chemical substances of interest in a liquid sample.

SUMMARY OF THE INVENTION

The invention is based, in part, upon the discovery of a new colorimetric sensor that can detect an analyte of interest in a fluid or liquid sample and that, in some implementations, may be disposed upon or integrated within a surface of a fluid receptacle (e.g., a glass or a cup) or a straw.

In a first aspect, the present invention relates to a colorimetric sensor for detecting an analyte of interest in a fluid sample. In some embodiments, the sensor includes a metal layer disposed upon a substrate and defining a plurality of holes, a plurality of nanostructures (e.g., nanoposts and/or nanospheres) each of which includes a first portion disposed within a respective one of the holes, a corresponding plurality of metal deposits (e.g., metal nanodisks and/or metal caps) spaced apart from the metal layer each of which is disposed upon a second portion of a respective one of the nanostructures (e.g., on a top surface of any of the nanoposts and/or on a top surface of any of the nanospheres), and a molecularly imprinted polymer layer that covers at least one of the metal layer, the nanostructures, and the metal deposits. In some variations, the molecularly imprinted polymer layer defines a cavity shaped to receive an analyte of interest. In some applications, the sensor is configured so that, when an analyte contacts the molecularly imprinted polymer layer and becomes disposed within the cavity, an optical property of at least a portion of the sensor changes thereby, causing a detectable color change in and/or from the sensor.

In some implementations, each nanostructure is made from a dielectric material, a second molecularly imprinted polymer, a blend of the dielectric material and the second molecularly imprinted polymer, and/or a dielectric material coated with the second molecularly imprinted polymer. The nanostructures may be configured to provide a periodic distribution from about 10 nanometers to about 2 micrometers. In some applications, a first subset of nanostructures is configured as a first sub-pixel to produce a first color and a second subset of nanostructures is configured as a second sub-pixel to produce a second, different color. In some variations, the nanostructures of the first subset include a dimension(s) that differs from the dimension(s) of the nanostructures of the second subset and/or the nanostructures of the first subset are arranged to have a periodicity different from the periodicity of the nanostructures of the second subset.

In some embodiments, the metal deposits are spaced apart from the metal layer by a distance between about 1 nanometer and about 2 micrometers. In some implementations, the molecularly imprinted polymer layer is optically transparent. In some applications, the sensor is disposed upon or integrated within a surface of a fluid receptacle or a straw.

In a second aspect, the present invention relates to a method for detecting an analyte of interest in a fluid sample. In some embodiments, the method includes the process steps of (a) contacting a colorimetric sensor with the fluid sample and (b) detecting whether a color change occurs when the sensor is contacted with the fluid sample. A color change is indicative that the analyte of interest is present in the fluid sample. In some applications, the sensor includes a metal layer disposed upon a substrate and defining a plurality of holes, a plurality of nanostructures (e.g., nanoposts and/or nanospheres) each of which includes a first portion disposed within a respective one of the holes, a corresponding plurality of metal deposits (e.g., metal nanodisks and/or metal caps) spaced apart from the metal layer each of which is disposed upon a second portion of a respective one of the nanostructures (e.g., on a top surface of one of the nanoposts and/or nanospheres), and a molecularly imprinted polymer layer that covers at least one of the metal layer, the nanostructures, and the metal deposits. The molecularly imprinted polymer layer may define a cavity shaped to receive an analyte of interest. In some applications, the sensor is configured such that, when an analyte contacts the molecularly imprinted polymer layer and becomes disposed within the cavity, an optical property of at least a portion of the sensor changes thereby, causing a detectable color change in and/or from the sensor. In some variations, the method further includes confirming that the analyte is present in the fluid sample by using a spectrometer to detect the Raman spectra of the analyte.

In some implementations, each nanostructure is made from a dielectric material, a second molecularly imprinted polymer, a blend of the dielectric material and the second molecularly imprinted polymer, and/or a dielectric material coated with the second molecularly imprinted polymer. The nanostructures may be configured to provide a periodic distribution from about 10 nanometers to about 2 micrometers. In some applications, a first subset of the nanostructures is configured as a first sub-pixel to produce a first color and a second subset of the nanostructures is configured as a second sub-pixel to produce a second color. In some variations, the nanostructures of the first subset include a dimension(s) that differs from the dimension(s) of the nanostructures of the second subset and/or the nanostructures of the first subset are arranged to have a periodicity that differs from the periodicity of the nanostructures of the second subset.

In some embodiments, the metal deposits are spaced apart from the metal layer by a distance between about 1 nanometer and about 2 micrometers. In some implementations, the molecularly imprinted polymer layer is optically transparent.

In a third aspect, the present invention relates to a method of manufacturing a colorimetric sensor capable of detecting an analyte of interest in a fluid sample. In some embodiments, the method includes: forming a plurality of nanostructures on a substrate, applying metal (e.g., aluminum, copper, silver, gold, platinum, tungsten, or combinations thereof) to at least a portion of each nanostructure and to at least a portion of the substrate (e.g., by a metal deposition process), and covering at least one of the nanostructures and the applied metal with a first molecularly imprinted polymer layer that defines a cavity shaped to receive an analyte of interest. In some implementations, the sensor is configured such that, when an analyte contacts the first molecularly imprinted polymer layer and becomes disposed within the cavity, an optical property of at least a portion of the sensor changes thereby to cause a detectable color change in and/or from the sensor.

In some applications, forming the nanostructures (e.g., nanoposts) includes coating a surface of the substrate with at least one of a dielectric material, a second molecularly imprinted polymer, or a blend of the dielectric material and the second molecularly imprinted polymer, and imprinting (e.g., using a mold) the nanostructures in the coating. In some variations, the coating has a thickness between about 1 nanometer and about 2 micrometers. In some implementations, the mold is coated with a release agent, such as a fluorocarbon release agent, a fluorosilane release agent, a polybenzoxazine release agent, or combinations thereof.

In another application, forming the nanostructures (e.g., nanospheres) includes one or more of self-assembling a layer of colloidal nanospheres on a surface of the substrate and/or shrinking the nanospheres. In some variations, the nanospheres are shrunk by an oxygen plasma process. Typical shrunk nanospheres may have a diameter between about 1 nanometer and about 2 micrometers. In some implementations, each nanosphere is made from a dielectric material, a second molecularly imprinted polymer, and/or a blend of the dielectric material and the second molecularly imprinted polymer.

The nanostructures may include a periodic distribution from about 10 nanometers to about 2 micrometers. In some embodiments, a first subset of the nanostructures is configured as a first sub-pixel to produce a first color and a second subset of the nanostructures is configured as a second sub-pixel to produce a second color. In some variations, the nanostructures of the first subset are configured with a dimension(s) that differs from the dimension(s) of the nanostructures of the second subset. In certain variations, the nanostructures of the first subset are configured with a periodicity that differs from the periodicity of the nanostructures of the second subset.

In some embodiments, the substrate includes or is made from glass, plastic, metal, rubber, wood, cellulose, wool, or combinations thereof. In some applications, the substrate is a fluid receptacle (e.g., a cup or a glass) or a straw. In some applications, the first molecularly imprinted polymer layer is optically transparent.

BRIEF DESCRIPTION OF THE DRAWINGS

In the drawings, like reference characters generally refer to the same parts throughout the different views. For the purposes of clarity, not every component may be labeled in every drawing. Also, the drawings are not necessarily to scale, emphasis instead generally being placed upon illustrating the principles of the invention. In the following description, various embodiments of the present invention are described with reference to the following drawings, in which:

FIG. 4A schematically illustrates a cross-sectional view of the plasmonic colorimetric sensor of FIG. 2 and includes a detail of receptor cavities in the protective layer made of a MIP material encasing the nanospheres, in accordance with some embodiments of the invention;

FIG. 4B schematically illustrates a cross-sectional view of the plasmonic colorimetric sensor of FIG. 4A in which the cavities are filled with an analyte target molecule, in accordance with some embodiments of the invention;

DETAILED DESCRIPTION

Figure 1C:
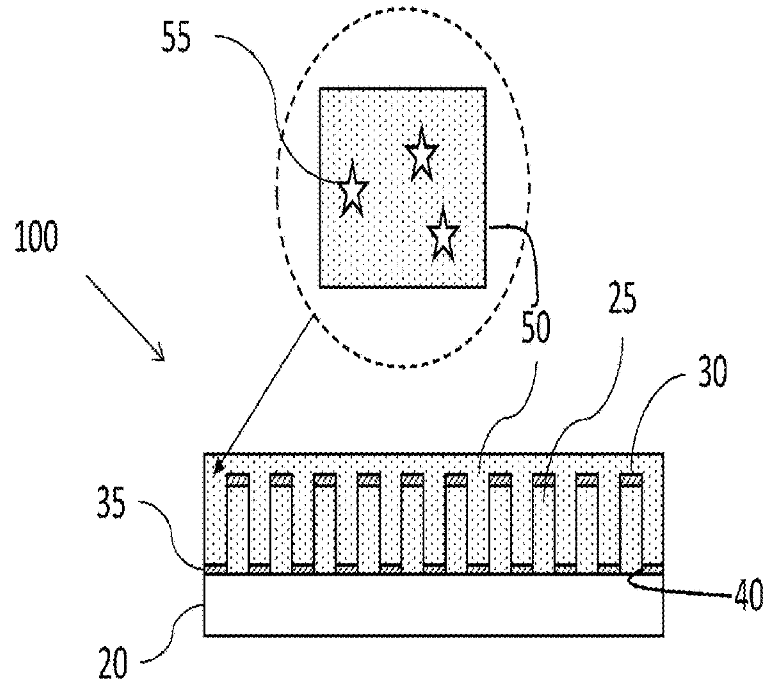
FIG. 1C schematically illustrates a cross-sectional view of the plasmonic colorimetric sensor of FIG. 1A and includes a detail of receptor cavities disposed in a protective layer made of a molecularly imprinted polymer (MIP) material encasing the nanoposts/nanopillars, in accordance with some embodiments of the invention.

To provide an overall understanding of the invention, certain illustrative embodiments will now be described, including devices (e.g., colorimetric sensors), methods of making the devices, and methods of detecting an analyte target molecule of interest in a fluid sample. However, the devices and methods described herein may be adapted and modified as appropriate for the application being addressed and the devices and methods described herein may be employed in other suitable applications. All such adaptations and modifications are to be considered within the scope of the invention.

Throughout the description, where compositions and devices such as a sensor are described as having, including, or comprising specific components, or where processes and methods are described as having, including, or comprising specific steps, it is contemplated that, additionally, there are compositions and devices of the present disclosure that consist essentially of, or consist of, the recited components, and that there are processes and methods according to the present disclosure that consist essentially of, or consist of, the recited processing steps.

In the application, where an element or component is said to be included in and/or selected from a list of recited elements or components, it should be understood that the element or component can be any one of the recited elements or components, or the element or component can be selected from a group consisting of two or more of the recited elements or components.

Further, it should be understood that elements and/or features of a device or a method described herein can be combined in a variety of ways without departing from the spirit and scope of the present disclosure, whether explicit or implicit herein. For example, where reference is made to a particular feature, that feature can be used in various embodiments of the devices of the present disclosure and/or in methods of the present disclosure, unless otherwise understood from the context. In other words, within this application, embodiments have been described and depicted in a way that enables a clear and concise application to be written and drawn, but it is intended and will be appreciated that embodiments can be variously combined or separated without parting from the present teachings and disclosure(s). For example, it will be appreciated that all features described and depicted herein can be applicable to all aspects of the disclosure(s) described and depicted herein.

The articles “a” and “an” are used in this disclosure to refer to one or more than one (i.e., to at least one) of the grammatical object of the article, unless the context is inappropriate. By way of example, “an element” means one element or more than one element.

The term “and/or” is used in this disclosure to mean either “and” or “or” unless indicated otherwise.

It should be understood that the expression “at least one of” includes individually each of the recited objects after the expression and the various combinations of two or more of the recited objects unless otherwise understood from the context and use. The expression “and/or” in connection with three or more recited objects should be understood to have the same meaning unless otherwise understood from the context.

The use of the term "include," "includes," "including," "have," "has," "having," "contain," "contains," or "containing," including grammatical equivalents thereof, should be understood generally as open-ended and non-limiting, for example, not excluding additional unrecited elements or steps, unless otherwise specifically stated or understood from the context.

Where the use of the term "about" is before a quantitative value, the present disclosure also includes the specific quantitative value itself, unless specifically stated otherwise. As used herein, the term "about" refers to a ±10% variation from the nominal value unless otherwise indicated or inferred.

Where a percentage is provided with respect to an amount of a component or material in a composition such as a polymer, the percentage should be understood to be a percentage based on weight, unless otherwise stated or understood from the context.

Where a molecular weight is provided and not an absolute value, for example, of a polymer, then the molecular weight should be understood to be an average molecule weight, unless otherwise stated or understood from the context.

It should be understood that the order of steps or order for performing certain actions is immaterial so long as the present disclosure remains operable. Moreover, two or more steps or actions can be conducted simultaneously.

At various places in the present specification, features are disclosed in groups or in ranges. It is specifically intended that the description include each and every individual subcombination of the members of such groups and ranges. For example, an integer in the range of 0 to 40 is specifically intended to individually disclose 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, and 40, and an integer in the range of 1 to 20 is specifically intended to individually disclose 1, 2, 3, 4, 5, 6, 7, 8, 9, 10, 11, 12, 13, 14, 15, 16, 17, 18, 19, and 20.

The use of any and all examples, or exemplary language herein, for example, "such as" or "including," is intended merely to illustrate better the present disclosure and does not pose a limitation on the scope of the disclosure unless claimed. No language in the specification should be construed as indicating any non-claimed element as essential to the practice of the present disclosure.

Various aspects of the disclosure are set forth herein under headings and/or in sections for clarity; however, it is understood that all aspects, embodiments, or features of the disclosure described in one particular section are not to be limited to that particular section but rather can apply to any aspect, embodiment, or feature of the present disclosure.

Surface Plasmon Resonance and Plasmonic Colorimetric Sensors

Surface plasmon resonance (SPR) is a phenomenon that generally occurs when incident light strikes a metallic surface, where electromagnetic fields, e.g., an electromagnetic surface wave, are very strong. Advantageously, spectral properties of the resonance, e.g., a plasmonic scattering profile resulting from reflected light waves having discrete wavelengths, may be used to characterize the local environment, especially after the metallic nanoparticle surface and, more particularly, electrons located on the surface of the nanoparticle, i.e., the surface plasmons, have been excited by the incident light. For example, incident light, striking near or between metallic nanoparticle surfaces and having a specific wavelength, excites surface plasmons, causing them collectively to oscillate. This oscillation generates a significantly enhanced electromagnetic field. The added presence of analyte target molecules that adhere to or are associated with the metallic nanoparticle surfaces modify the local dielectric environment, further inducing a plasmonic scattering profile change that, advantageously, may lead to enhanced macroscopic color change that can be used to detect and/or confirm the presence of an analyte target molecule in a fluid sample.

In the structure and design of plasmonic colorimetric sensors, the scattered or reflected color is primarily determined by a localized plasmon resonance between two metal surfaces separated by a coupling distance. According to the Mie theory, the size and shape of the metal surfaces, e.g., nanoposts, nanopillars, nanospheres, and the like, also affects the plasmon resonance. Likewise, periodicity between adjacent metal surfaces also affects the plasmon resonance. For example, the closer the metallic surfaces are to each other, the greater the coupling between the interacting dipoles of the two metallic surfaces. The greater the interactive dipole coupling, the greater the increase of the plasmon resonant wavelength. In contrast, the more distant the metallic surfaces are from one another, the weaker the coupling between the interacting dipoles, resulting in a decrease of the plasmon resonant wavelength.

In some embodiments, the plasmonic colorimetric sensors described herein include nanostructure antennas having an array of nanoposts, nanopillars, nanospheres, or the like. For such sensors, the nanoposts/nanopillars/nanospheres may be used to provide the coupling distance between the two metallic surfaces. A first embodiment of a plasmonic colorimetric sensor having an array of metal-capped nanoposts, nanopillars, or the like is shown in FIGS. 1A through 1C, while a second embodiment of a plasmonic colorimetric sensor having an array of metal-capped nanospheres is shown in FIG. 2.

Figure 1B:
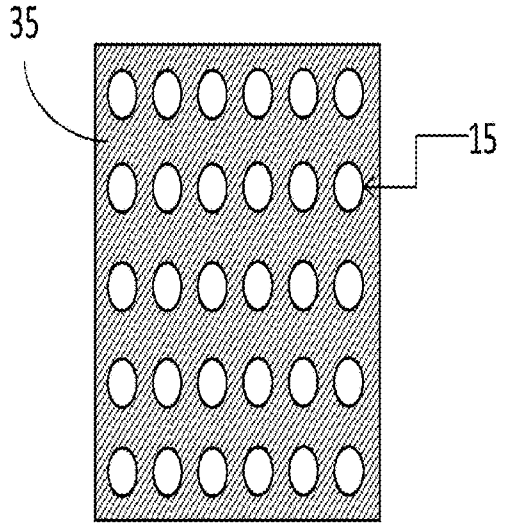
FIG. 1B schematically illustrates a plan view of the plasmonic colorimetric sensor of FIG. 1A, in accordance with some embodiments of the invention.
Figure 1A:
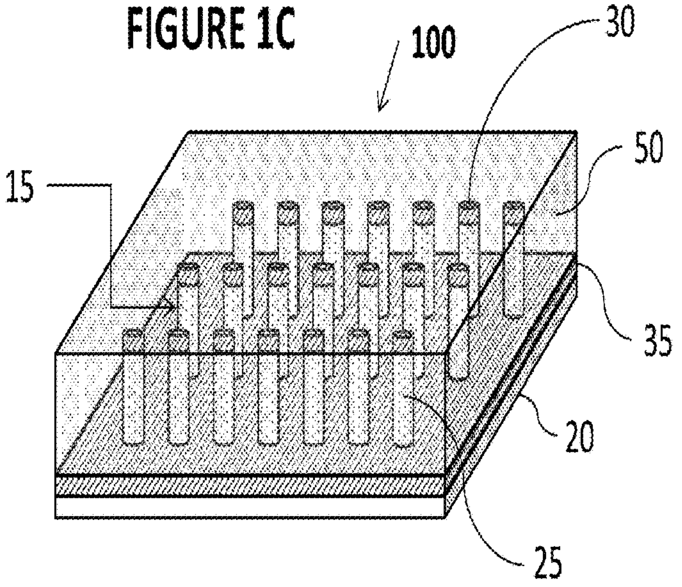
FIG. 1A schematically illustrates a top perspective view of a plasmonic colorimetric sensor having a plurality of rod-like metal-insulator-metal (MIM) nanostructures arranged in an array of nanoposts/nanopillars, in accordance with a first embodiment of the invention.
Figure 2:
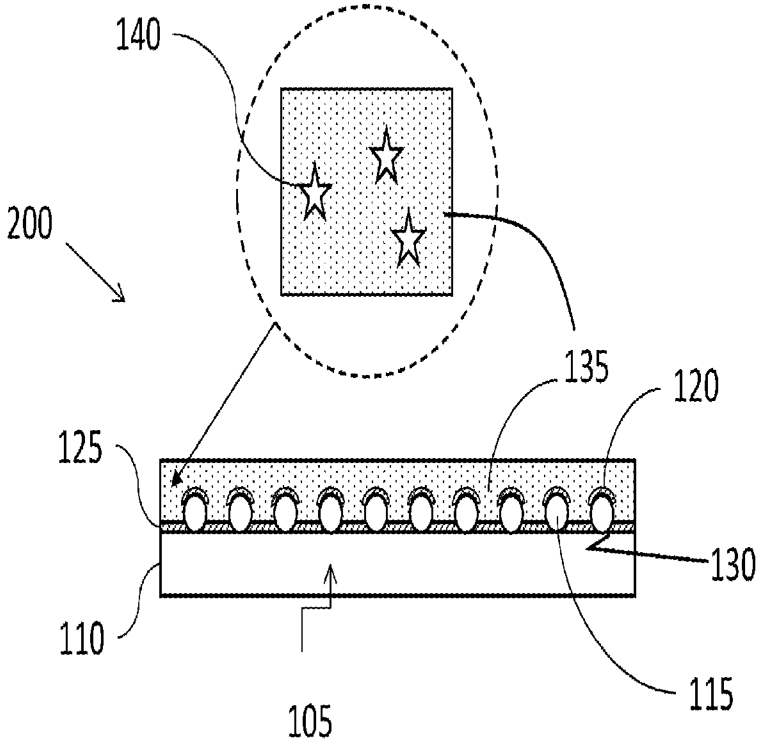
FIG. 2 schematically illustrates a cross-sectional view of a plasmonic colorimetric sensor having a plurality of MIM nanostructures arranged in an array of nanospheres and includes a detail of receptor cavities disposed in a protective layer made of a MIP material encasing the nanospheres, in accordance with a second embodiment of the invention.

The embodied sensor array 100 depicted in FIGS. 1A through 1C includes a plurality of rod-like, metal-insulator-metal (MIM) antenna structures 15 that are formed, deposited, or the like on a base substrate 20. The exemplary sensor array 200 depicted in FIG. 2 includes a plurality of nano-spheroidal MIM antenna structures 105 that are formed, deposited, or the like on a base substrate 110. Aside from the characteristics, i.e., the size, shape, dimensions, number, periodicity, etc., of the MIM antenna structures 15, 105 in the two embodiments, the exemplary sensors 100, 200 work in substantially the same manner. More particularly, the MIM antenna structures 15, 105 may be configured to produce, in the presence of an analyte target molecule and when struck by incident light of a particular wavelength, an observable change in color within the visible spectrum. Indeed, as mentioned herein, when incident light of a particular wavelength strikes the MIM antenna structure 15, 105, the light scattered by the sensors 100, 200 will produce an observable color change, providing presumptive evidence of the presence of the analyte target molecule.

For the purpose of illustration and not limitation, the rod-like MIM antenna structures 15 in the sensor array 100 in FIGS. 1A through 1C may be disposed on a base substrate 20 in, for example, a grid, for example, a 5×6 grid, with each antenna structure 15 having the same or substantially the same size, e.g., dimensions (height and width), and shape (cylindrical or substantially cylindrical), as well as periodicity, i.e., spacing between adjacent antenna structures 15.

Those of ordinary skill in the art can appreciate that the number and arrangement of the antenna structures 15 in the sensor array 100, as well as the shape, size, and the like of each antenna structure 15 and the periodicity between adjacent antenna structures 15 may be subject to the design and purpose of the array 100.

In some variations, each MIM antenna structure 15 includes a nanopost or nanopillar 25 structured and arranged to have a desired shape, height, width, diameter, or other dimension, as well as periodicity, i.e., spacing between adjacent nanoposts or nanopillars 25. In various embodiments, the nanoposts or nanopillars may be manufactured from a molecularly imprinted polymer (MIP) material, from a dielectric or insulative material (e.g., glass, SiO2, polymer, and so forth), from a dielectric material coated with a MIP material, and/or from a material comprising a blend of a MIP material and a dielectric material. Preferably, the MIP materials define cavities for attracting and capturing and/or for adsorbing discrete analyte target molecules. Although FIGS. 1A through 1C depict cylindrically-shaped or substantially-cylindrically-shaped nanopillars 25, that is done for the purpose of illustration and not limitation. Indeed, in addition to being circular or round, exemplary nanopillar cross-sections may be elliptical, rectangular, square, triangular, polygonal, amorphous, and the like. Typical heights for nanopillars may range between about one (1) nm and about 2000 nm, or between about 5 nm and about 1000 nm, or between about 10 nm and about 500 nm. Typical diameters for (cylindrical) nanopillars may range between about 10 nm and about 1000 nm, or between about 15 nm and about 750 nm, or between about 20 nm and about 500 nm. Typical spacing between adjacent nanopillars may range between about 10 nm and about 2000 nm, or between about 15 nm and about 1000 nm, or between about 20 nm and about 500 nm.

In some applications, the MIP material may generally be manufactured by polymerization, e.g., by thermal and/or photochemical initiation, of a mixture of monomers, cross-linkers, initiators, and/or porogens, or combinations thereof and the like. Typical monomers include, for the purpose of illustration and not limitation, carboxylic acids (e.g., acrylic acid, methacrylic acid, vinylbenzoic acid, and trifluoromethyl acrylic acid (TFMAA)), sulphonic acids (e.g., 2-acrylamido-2-methylpropane sulphonic acid), heteroaromatic bases (e.g., vinylpyridine and vinylimidazole), acrylamide, 2-hydroxyethylmethacrylate (HEMA), and the like. Typical cross-linkers include, for the purpose of illustration and not limitation, ethylene glycol dimethacrylate (EGDMA), trimethylolpropane trimethacrylate (TRIM), divinylbenzene (DVB), pentaerythritol triacrylate (PETRA), and the like. Typical initiators include, for the purpose of illustration and not limitation, acetyl peroxide, lauroyl peroxide, decanoyl peroxide, caprylyl peroxide, benzoyl peroxide, tertiary butyl peroxypivalate, sodium percarbonate, tertiary butyl peroctoate, azobis-isobutyronitrile (AIBN), and the like. Typical porogens include, for the purpose of illustration and not limitation, methanol, acetonitrile, toluene, mineral oil, and combinations thereof.

A portion or portions of the MIM antenna structure may include metallic materials, e.g., platinum, gold, silver, aluminum, copper, tungsten, and combinations thereof. For example, as shown in FIG. 1A, each MIM antenna structure 15 in the sensor array 100 may include a thin (e.g., 0.1 nm to several hundreds of nanometers) metallic cap or nanodisk 30, e.g., that has been formed or deposited on a first (e.g., top) surface of each nanopillar 25. Furthermore, a thin (e.g., 0.1 nm to several hundreds of nanometers) metallic back reflector layer, or backplane 35, may also be deposited on the base substrate 20 about a second (e.g., bottom) surface of each nanopillar 25. In some embodiments, the base substrate is made of, for example, glass, plastic, metal, wood, rubber, wool, cellulose, combinations thereof, and the like. In some variations, the metallic backplane 35 includes a plurality of openings 40 (e.g., holes) through which a portion of each nanopillar 25 of each MIM antenna structure 15 extends or protrudes. Preferably, the size and shape of the openings correspond to the size and shape of the nanopillars. In some variations, the coupling distance between the upper surface of the metallic backplane and the bottoms of the nanodisks is about one (1) nm to about 2000 nm, or about 5 nm to about 1000 nm, or about 10 nm to about 500 nm.

The metallic backplane and nanodisks formed or disposed atop, respectively, each of the base substrate and the nanopillars provide vertical limits for collecting and focusing incident light. With only the nanodisks present, for example, the optical scattering intensity would be very low, making it difficult to observe the scattered color. By combining the nanodisks with the metallic backplane, however, plasmonic coupling between the upper and lower components may increase or enhance the scattering intensity and the hues. Advantageously, plasmonic coupling between the nanodisks and the backplane may result in a vibrant color without viewing angle dependence. Indeed, the emitted structural color due to the plasmonic coupling may differ from a structural color generated from, for example, dielectric photonic crystals with which the emitted color may depend on the viewing angle due to the light diffraction principle.

For protection and to provide a cavity with which to capture an analyte, one, two, or all of the antenna structures 15, the metallic nanodisks 30, and the metallic backplane 35 may be encased within an optically-transparent protective layer 50. In some embodiments, the protective layer 50 is manufactured of a molecularly imprinted polymer (MIP) material or of a blend of a dielectric material and a MIP material. Here again, the MIP material may generally be made by polymerization, e.g., by thermal and/or photochemical initiation, of a mixture of monomers, cross-linkers, initiators, and/or porogens, or combinations thereof and the like. The MIP material used for the protective layer, or blended with a dielectric material for the protective layer, may be the same or different from the MIP material used in construction of the nanopillars. Preferably, the protective layer 50 defines cavities 55 produced by, for example, removing template molecules from the MIP materials. In some variations, the cavities are shaped to receive discrete analyte target molecules.

The cavities can be formed in a MIP by removing the analyte templates from the MIP. The MIPs formed in this way may include a soluble and processible MIP synthesized following the three steps depicted below. Note that this is just an example as MIPS can be created using other forms of polymerization.

Step 1. The Preparation of a Multi-armed RAFT Reagent

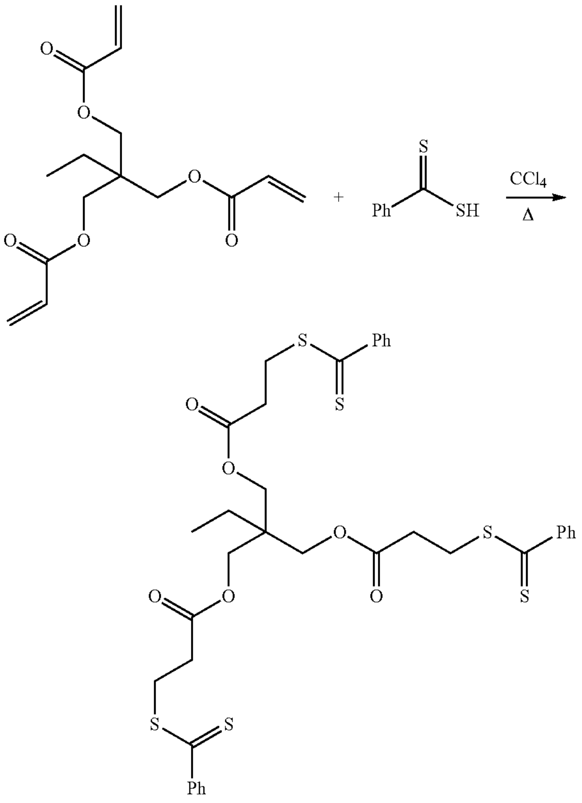

Step 2. The Preparation of a Crosslinkable and Imprintable Core With Multi-armed RAFT Reagent, Spacer Monomer, and Crosslinking Monomer

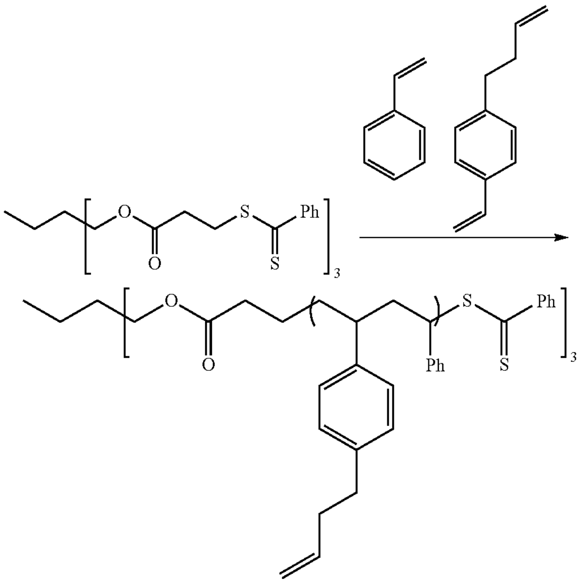

Step 3. Addition of Template (Ketamine as an Example) for Imprinting and Crosslinking Process to Make the MIP

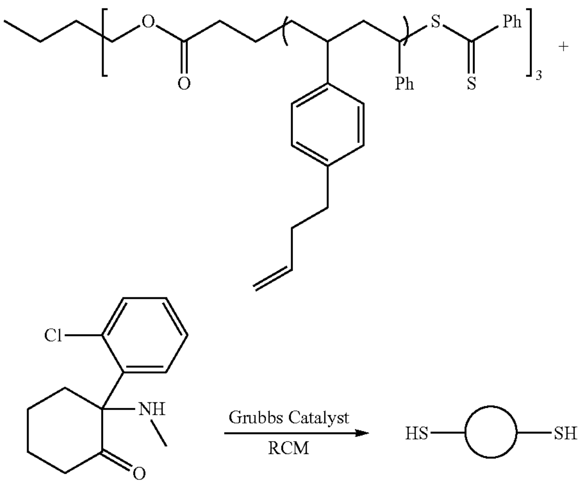

The resulting soluble and processible MIP can be blended with other dielectric materials so that it can be applied to the sensor as both a functional and a protective layer. Also, the MIPs can be made from conventional polymerization methods to yield fine MIP powder or colloidal nanoparticles that can be blended with other dielectric materials (such as UV-curable polymers).

Figure 3A:
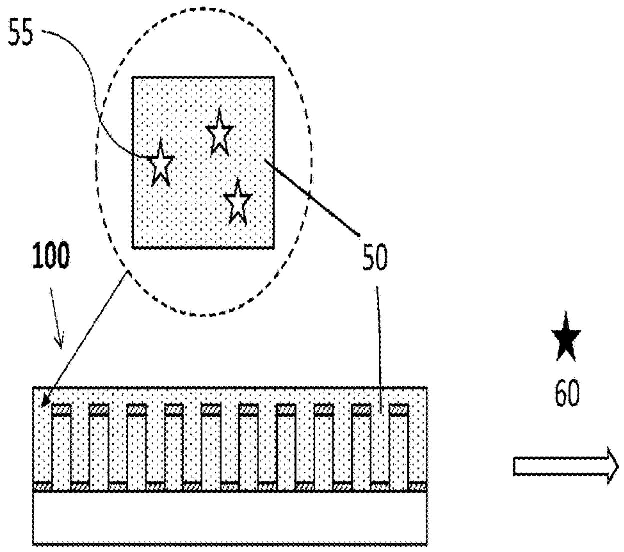
FIG. 3A schematically illustrates a cross-sectional view of the plasmonic colorimetric sensor of FIG. 1A and includes a detail of receptor cavities in the protective layer made of a MIP material encasing the nanoposts/nanopillars, in accordance with some embodiments of the invention.
Figure 3B:
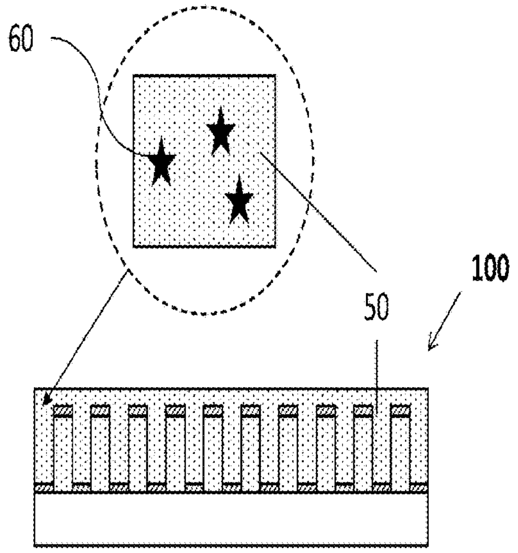
FIG. 3B schematically illustrates a cross-sectional view of the plasmonic colorimetric sensor of FIG. 3A in which the cavities are filled with an analyte target molecule, in accordance with some embodiments of the invention.

The MIP protective layer can include a chemical moiety (e.g., a "receptor" or "binding site") that can form a complex (e.g., host-guest chemistry) with an analyte target molecule of interest via a non-covalent bond, for example, via hydrogen bonding, metal coordination, hydrophobic forces, van der Waals forces, n-n interactions, halogen bonding, and/or electrostatic and/or electromagnetic effects. Examples of such receptors include, but are not limited to, urea, thiourea, guanidine, aminopyridine, or amidine, cucurbituril, cyclodextrin, calixarene, crown ether, porphyrin, phthalocyanine, and the like. See, e.g., Jonathan W. Steed, Jerry L. Atwood, Philip A. Gale, "Definition and Emergence of Supramolecular Chemistry," chapter in Supramolecular Chemistry: From Molecules to Nanomaterials (2012). The use of such a receptor can facilitate positioning of the analyte. For example, as shown in FIGS. 3A and 3B, such a receptor further can facilitate an analyte target molecule 60 positioning itself within a cavity 55 formed or disposed on or within the protective layer 50 of MIP material.

The binding of analyte target molecules can result in an observable color change, e.g., from blue to red, within the visible light spectrum. Advantageously, the initial color before analyte binding may be tuned and optimized by varying the size and shape of the nanopillars, as well as by varying the periodicity of the nanopillars on the sensor array. Although FIGS. 3A and 3B only show cavities 55 associated with and within the protective layer 50, if the nanopillars 25 are manufactured of a MIP material, of a blended dielectric-MIP material, and/or of a dielectric material coated with a MIP material, an analyte target molecule 60 may also position itself within a cavity formed or disposed on or within the nanopillars 25.

The protective layer and/or nanopillars, each of which can be a MIP, may be formed by any molecular imprinting technique (e.g., a reversible addition-fragmentation chain transfer (RAFT) polymerization method, an atom-transfer radical polymerization (ATRP) method, a covalent bonding method, a self-assembly method, a hierarchical imprinting method, a polymerization packed bed method, or the like) that can leave a cavity in the protective layer or nanopillars, which cavity has an affinity to a chosen "analyte" molecule. In some techniques, the process may involve initiating the polymerization of monomers in the presence of an analyte of interest that is extracted afterwards, thus leaving behind a cavity that is complementary to the analyte. MIPs are described in greater detail in U.S. Pat. Nos. 8,241,575 and 9,285,352, the contents of which are incorporated by reference herein in their entirety for all purposes.

For example, a MIP can be made from a monomer and a crosslinker. In some embodiments, a MIP can be made from a polymerizable monomer, optionally having a receptor that can bind with an analyte molecule, such as a urea or a thiourea receptor, and/or a cross-linkable monomer that contains two or more reactive groups such as one vinyl moiety and one allylic moiety. Each of the two or more reactive groups should have different reactivities such that they can be employed in different stages of the manufacture of a MIP. For example, a vinyl group can be employed for incorporation into a pre-polymer for a MIP and a less reactive allylic group can be used as a crosslinker during the molecularly imprinting process. Other asymmetrically divinyl or vinyl/allyl or other monomers with two double bonds of different reactivity can be used, for example, methacrylate-based divinyl monomers such as hex-5-enyl methacrylate. See, e.g., "Controlled Divinyl Monomer Polymerization Mediated by Lewis Pairs: A Powerful Synthetic Strategy for Functional Polymers," ACS Macro Lett., 2014, 3, 896-899 and "Branched polystyrene with abundant pendant vinyl functional groups from asymmetric divinyl monomer", Journal of Polymer Science: Part A: Polymer Chemistry, 2008, 46, 6023-6034.

Scheme I shows an example of forming, via RAFT polymerization, a "pre-polymer" (i.e., a polymer useful in the molecularly imprinting process) using a cross-linkable monomer having two reactive groups of different reactivities and a polymerizable monomer containing a polymerizable moiety and a urea receptor.

Scheme I

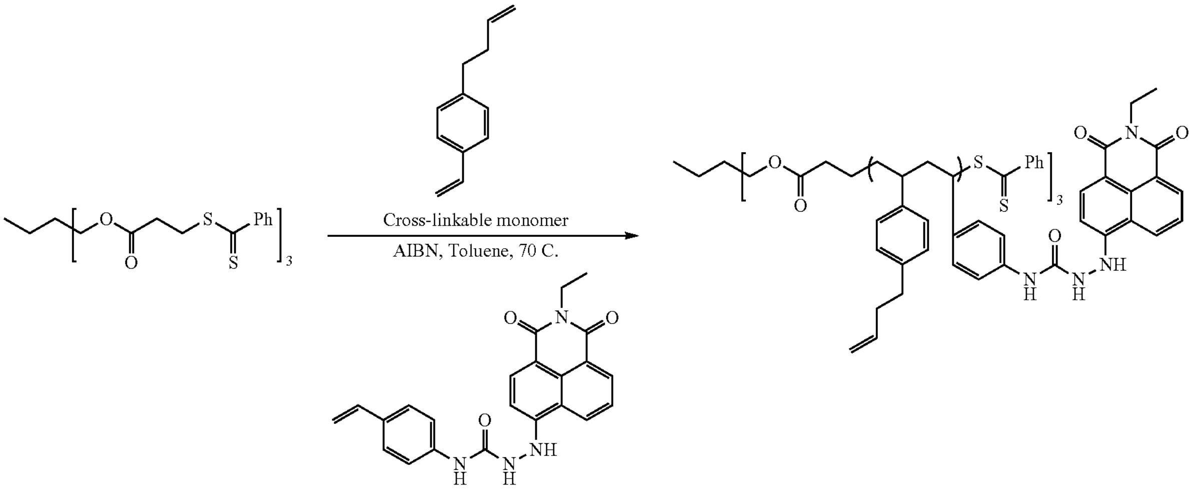

Naphthalimide-containing monomer

The result of RAFT polymerization of these reactants is a "pre-polymer" that includes the RAFT agent at a terminal end. The pre-polymer typically is a soluble pre-polymer, which facilitates further creation of the protective layer and nanopillars.

Subsequently, as shown in Scheme II below, the pre-polymer can be combined with an analyte of interest ("analyte template") to perform the molecularly imprinting process thereby to create the cavities for the analyte. More specifically, the pre-polymer and analyte interact to associate the analytes with the urea receptors, which pre-polymer then can be crosslinked to form the cavities after the analyte is removed from the MIP (e.g., by Soxlet extraction and/or solvent washing processes). As can be seen in Scheme II, a MIP can include a RAFT agent at its terminal end. Advantageously, the functional groups and modified functional groups of the RAFT agent, for example, a thiol group after reduction of the depicted RAFT agent, can be used to secure the MIP to a substrate as a coating layer such as in the top-down methods of manufacture discussed herein.

Scheme II

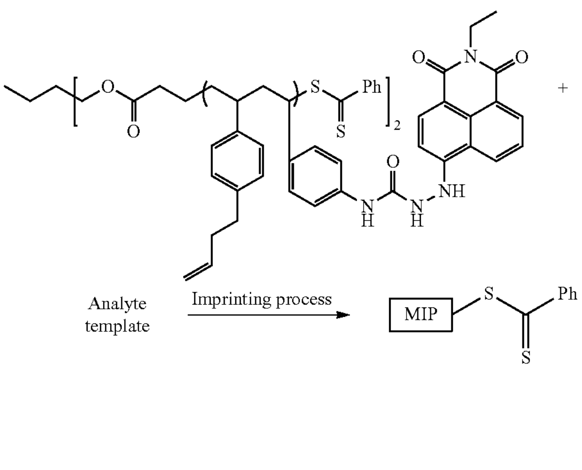

When an analyte target molecule is adsorbed into or bound to a cavity of the protective layer and/or one of the nanopillars, one or several changes may occur to produce the observable color change, e.g., from the color blue to the color red. For example, changes in the effective refractive index (n) in the localized environment of the MIP material (e.g., due to the presence of the analyte target molecule) may affect the dipole interaction between the metallic nanodisks and the backplane. This dipole interaction determines the scattered hybridized plasmon resonance, i.e., the color. Alternatively, or in addition, adsorption of the analyte to the cavities may cause the nanopillars to swell (e.g., increase in height), which, in turn, may modify, i.e., increase, the coupling distance between the metallic nanodisks and the backplane. Increasing the coupling distance between the two metallic surfaces decreases the coupling between the interacting dipoles of the metallic nanodisks and the metallic backplane, thereby decreasing the plasmon resonant wavelength. In turn, the reduced plasmon resonant wavelength leads to an observable color change in the colorimetric sensor.

In various embodiments, analytes are adsorbed into or bound to cavities of both the protective layer and the nanopillars. Some analytes may, for example, diffuse through the protective layer and into the nanopillars due to the porous nature of the relatively thin protective layer. The presence of the analytes in the cavities of both the protective layer and the nanopillars will thus cause both the protective layer and the nanopillars to expand, thereby increasing the coupling distance between the metallic nanodisks and the backplane.

FIG. 2 depicts a sensor array 200 that includes a plurality of spheroidal MIM antenna structures 105. The spheroidal MIM antenna structures 105 may be formed or disposed in a grid or pattern on a base substrate 110. Those of ordinary skill in the art can appreciate that the number and arrangement of the antenna structures in the sensor array, the shape, size, dimensions, diameter, and the like of each antenna structure, and the periodicity between adjacent antenna structures may be subject to the design and purpose of the sensor array.

In some applications, each MIM antenna structure 105 includes a monolayer of nanospheres 115 manufactured from a molecularly imprinted polymer (MIP) material, from a dielectric or insulative material (e.g., glass, SiO2, polymer, and so forth), from a dielectric material coated with a MIP material, and/or from a material comprising a blend of a MIP material and a dielectric material. The spheroidal-shaped or substantially-spheroidal-shaped nanospheres 115 depicted in FIG. 2 may be oblate, prolate, and/or spherical. Typical diameters of the nanospheres may range between about 1 nm and about 2000 nm, or between about 5 nm and about 1000 nm, or between about 10 nm and about 500 nm. Typical spacing between adjacent nanospheres may range between about 10 nm and about 2000 nm, or between about 15 nm and about 1000 nm, or between about 20 nm and about 500 nm.

Some portion or portions of each antenna nanostructure 105 in a sensor array may be made from metallic materials, e.g., platinum, gold, silver, aluminum, copper, tungsten, and combinations thereof. For example, as shown in FIG. 2, each MIM antenna structure 105 in the sensor array 200 may include a thin (e.g., 0.1 nm to several hundreds of nanometers) metallic cap 120 that has been formed or deposited on or at the crown of a first (e.g., top) surface of each nanosphere 115. A thin (e.g., 0.1 nm to several hundreds of nanometers) metallic back reflector layer, or backplane 125, may also be deposited on the base substrate 110 about a second (e.g., bottom) surface of each nanosphere 115. In some embodiments, the base substrate is made of, for example, glass, plastic, metal, wood, rubber, wool, cellulose, combinations thereof, and the like. In some variations, the metallic backplane 125 includes a plurality of openings 130 (e.g., holes) through which a portion of each nanosphere 115 of each MIM antenna structure 105 extends or protrudes. Preferably, the size and shape of the openings correspond to the size and shape of some portion of the nanospheres. In some variations, the coupling distance between the upper surface of the metallic backplane and the bottoms of the metallic caps is about one (1) nm to about 2000 nm, or about 5 nm to about 1000 nm, or about 10 nm to about 500 nm.

The metallic backplane formed or disposed on the base substrate and the metallic caps formed or disposed on or at the crown of the nanospheres provide vertical limits for collecting and focusing incident light. With only the metallic caps present, for example, the optical scattering intensity would be very low, making it difficult to observe the scattered color. By combining the metallic caps with the metallic backplane, however, plasmonic coupling between the upper and lower components may increase or enhance the scattering intensity and the hues. Advantageously, plasmonic coupling between the metallic caps and the backplane may result in a vibrant color without viewing angle dependence. Indeed, the emitted structural color due to the plasmonic coupling may differ from a structural color generated from, for example, dielectric photonic crystals with which the emitted color may depend on the viewing angle due to the light diffraction principle.

Again referring to FIG. 2, one, two, or all of the antenna structures 105, the metallic caps 120, and the metallic backplane 125 may be encased within a protective layer 135, which can be optically transparent. In some embodiments, the protective layer is manufactured of a MIP material or of a blend of a dielectric material and a MIP material. The MIP material used for the protective layer, or blended with a dielectric material for the protective layer, may be the same or different from the MIP material used in construction of the nanospheres.

In some embodiments, the MIP material of the protective layer and/or nanospheres is made from the polymerization, e.g., by thermal and/or photochemical initiation, of a mixture of monomers, cross-linkers, initiators, and/or porogens, or combinations thereof and the like. Typical monomers, cross-linkers, initiators, and/or porogens for the MIP materials of the protective layer and nanospheres can be the same as those enumerated herein for the nanoposts/nanopillars and protective layer described with reference to FIGS. 1A through 1C. Preferably, the protective layer 135 defines cavities 140 produced by, e.g., removing template molecules from the MIP materials. In some variations, the cavities are shaped to receive discrete analyte target molecules.

As described herein, the MIP protective layer can include a chemical moiety (e.g., a “receptor” or “binding site”) that can form a complex (e.g., host-guest chemistry) with an analyte target molecule of interest via a non-covalent bond. The use of such a receptor can facilitate positioning of the analyte. For example, as shown in FIGS. 4A and 4B, such a receptor further can facilitate an analyte target molecule 145 positioning itself within a cavity 140 formed or disposed on or within the protective layer 135 of MIP material. The binding of analyte target molecules results in an observable color change, e.g., from blue to red, within the visible light spectrum. Advantageously, the initial color before analyte binding may be tuned and optimized by varying the size and shape of the nanospheres 115, as well as by varying the periodicity of the nanospheres 115 on the sensor array 200. Although FIGS. 4A and 4B only show cavities 140 associated with and within the protective layer 135, if the nanospheres are manufactured of a MIP material, of a blended dielectric-MIP material, and/or of a dielectric material coated with a MIP material, an analyte target molecule may also position itself within a cavity formed or disposed on or within the nanospheres.

Similar to a sensor having nanopillars, when an analyte target molecule is adsorbed into or captured by or bound to a cavity within the protective layer and/or on the nanospheres, one or several changes may occur to produce the observable color change, e.g., from the color blue to the color red. For example, changes in the effective refractive index (n) in the localized environment of the MIP material (e.g., due to the presence of an analyte target molecule) may affect the dipole interaction between the metallic caps and the backplane. This dipole interaction determines the scattered hybridized plasmon resonance, i.e., the color. Alternatively, or in addition, adsorption of the analyte to the cavities may cause the nanospheres to swell (e.g., increase in height and/or diameter), which, in turn, may modify, i.e., increase, the coupling distance between the metallic caps and the backplane. Increasing the coupling distance between the two metallic surfaces decreases the coupling between the interacting dipoles of the metallic caps and the metallic backplane, thereby decreasing the plasmon resonant wavelength. In turn, the reduced plasmon resonant wavelength leads to an observable color change in the colorimetric sensor.

In various embodiments, analytes are adsorbed into or bound to cavities of both the protective layer and the nanospheres. Some analytes may, for example, diffuse through the protective layer and into the nanospheres due to the porous nature of the relatively thin protective layer. The presence of the analytes in the cavities of both the protective layer and the nanospheres will thus cause both the protective layer and the nanospheres to expand, thereby increasing the coupling distance between the metallic caps and the backplane.

Those of ordinary skill in the art can appreciate that a MIP material as described herein may include any number of cavities appropriate to achieve the intended purpose. The number of cavities may, in part, be determined by the dissociation constant of the material used for the MIP material. As different materials will have different dissociation constants, the number of cavities present in the protective layer, in the nanoposts/nanopillars, and/or in the nanospheres may depend upon the type of material employed as the MIP material. In general, however, the average density of the cavities may be very high (e.g., up to $10^{10}$, $10^{15}$, or $10^{20}$ cavities per gram of MIP material). There may also be some variation in the number, density, and arrangement (e.g., distribution or pattern) of the cavities in the MIP material.

Each formed cavity in a MIP should have an affinity for a corresponding analyte target molecule of interest, which may include, for the purpose of illustration and not limitation, GBL, GHB, ketamine, Rohypnol, other pharmaceutical grade drugs, bacteria, allergens and proteins, 3-methyl-2-butene-l-thiol, substances that may be created during a process of creating 3-methyl-2-butene-l-thiol, substances that may be created when beer is exposed to sunlight, congeners (e.g., produced during fermentation and/or distillation of a beverage), and so forth.

Illustrative embodiments of nanostructure sensor arrays have been depicted and described for instances in which the nanoposts/nanopillars or nanospheres formed or disposed in a sensor array on a single base substrate share the same or substantially the same size, shape, periodicity, and so forth. Those of ordinary skill in the art can appreciate, however, that, in some applications of the present invention, one or more groupings of nanostructures may be formed or disposed on a base substrate, such that one or more of the properties or parameters of one of the nanostructure groupings intentionally differs from the properties or parameters of another of the nanostructure groupings, so as to produce different changes in the colors emitted by the various nanostructure groupings. Indeed, at a microscopic (e.g., pixel and sub-pixel) level, a first nanostructure grouping, having a first set of design and structural properties, may be formed or disposed on a first portion of a base substrate, so as to emit, under a first set of operating conditions, a first color, while, under the same first set of operating conditions, a second nanostructure grouping, having a second set of design and structural properties, may be formed or disposed on a second portion of the base substrate, so as to emit a second color that differs from the first color. Under a second set of operating conditions, the individual microscopic colors emitted by the first and second nanostructure groupings may produce a color change that, at the macroscopic level of the array, becomes more pronounced or more distinct.

Figure 5A:
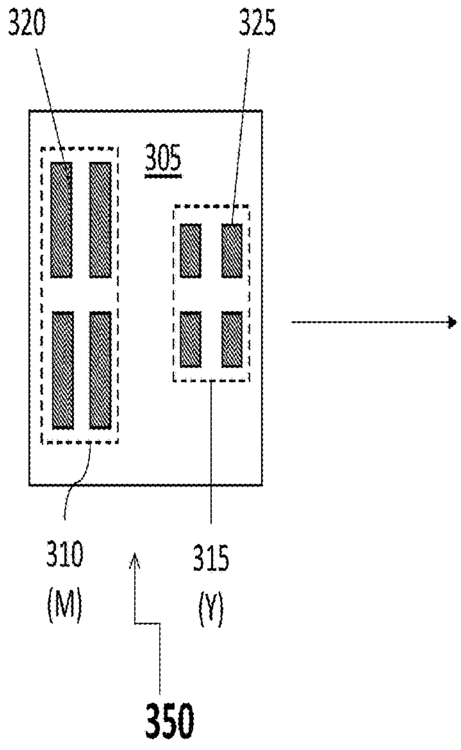
FIG. 5A schematically illustrates a plan view of a pixel having two sub-pixels that each have a plurality of subwavelength plasmonic MIM nanostructures, in accordance with some embodiments of the invention.
Figure 5B:
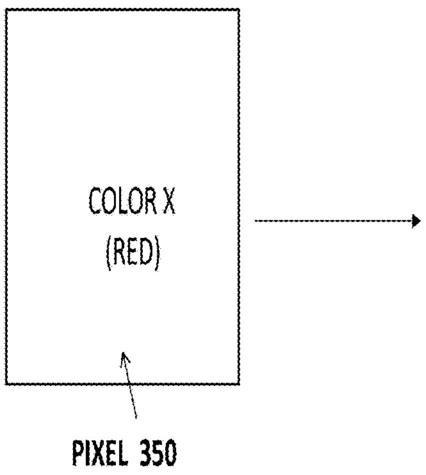
FIG. 5B schematically illustrates a view of the individual pixel of FIG. 5A emitting a first color, in accordance with some embodiments of the invention.
Figure 5C:
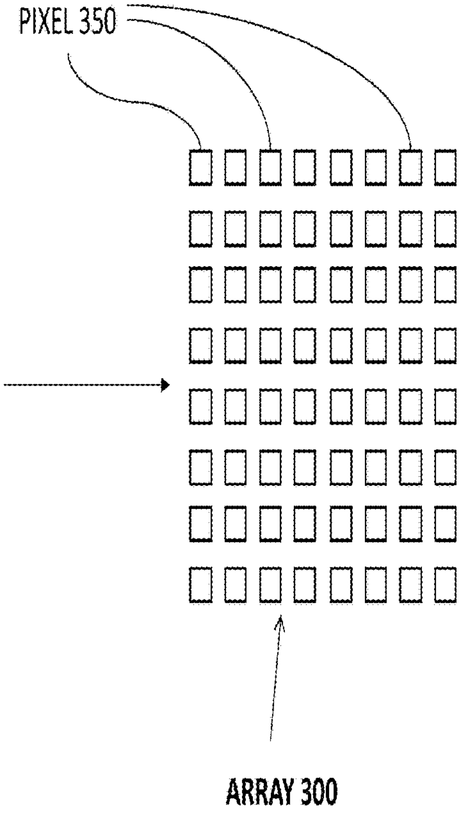
FIG. 5C schematically illustrates a view of an array of the pixels of FIG. 5B, in accordance with some embodiments of the invention.

For example, referring to FIGS. 5A through 5C, an exemplary sub-wavelength, nanostructured, color pixel array 300 for detecting the presence of an analyte target molecule is shown. In some variations, the nanostructure sensor array 300 includes a plurality of pixels 350 that, for the purpose of illustration rather than limitation, are arranged in an 8×8 array. Those of ordinary skill in the art can appreciate that the number and the arrangement of the pixels 350 in the sensor array 300 may be configured in accordance with design parameters to emit a macroscopic level color representative of the operating condition of the sensor array 300 as a whole, i.e., as a combination of the microscopic color emissions by the individual color pixels 350, as well as those of the nanostructure groupings, i.e., sub-pixels 310, 315 formed or disposed on the base substrate 305 of each pixel 350.

For example, in some implementations, one or more pixels 350 in the nanostructure sensor array 300 may include a base substrate 305 on which a first grouping of metal-insulator-metal (MIM) antenna structures 320, e.g., in a first sub-pixel 310, and on which a second grouping of MIM antenna structures 325, e.g., in a second sub-pixel 315, are formed or disposed. In operation and by design, each sub-pixel 310, 315 may be structured and arranged to emit, under a first set of operating conditions, scattered light of a certain color that, in combination, produces light of a desired color associated with the pixel 350 (e.g., Color X or red). For example, under the first set of operating conditions, sub-pixel 310 may emit magenta-colored light and sub-pixel 315 may emit yellow-colored light, which, when mixed together, produces red-colored light in the pixel 350. Under a second set of conditions, each sub-pixel 310, 315 may be structured and arranged to emit scattered light of a certain color that, in combination, provides a desired color change in the pixel 350. A combination of the colors of each of the plurality of pixels, under each of the first and the second sets of conditions, in turn, produces a change or changes in the color or in a pattern in the array sensor indicative of the respective condition.

In some applications, each pixel in the sensor array includes one or more MIM antenna structures, i.e., plasmonic nanostructures, grouped into any number of sub-pixels. For the purpose of this description, a sub-pixel may be used to differentiate any grouping of MIM antenna structures having a first set of design properties or parameters, e.g., size, shape, periodicity, and the like, from another grouping of MIM antenna structures having a second set of design properties or parameters, at least one of which differs from any of the first set of design properties or parameters.

Figure 6A:
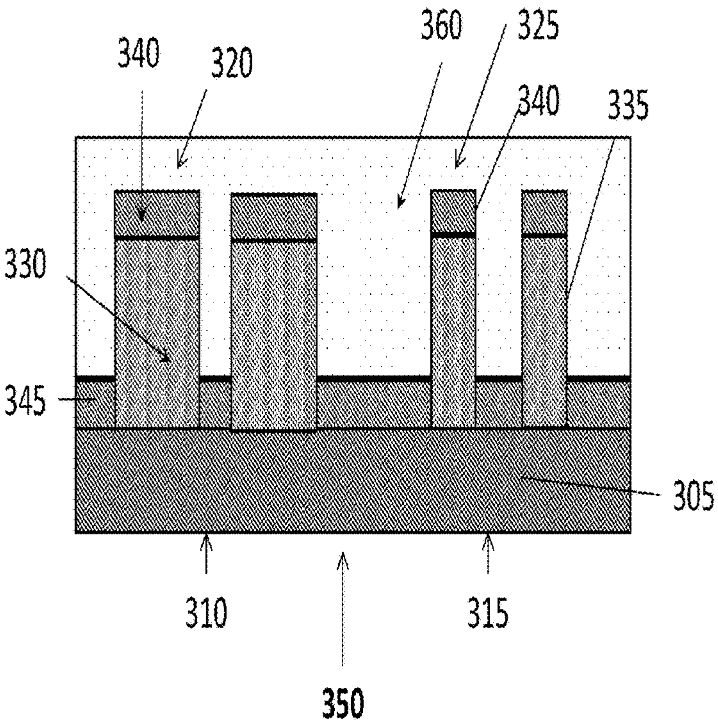
FIG. 6A schematically illustrates a cross-sectional view of the pixel of FIG. 5A having plasmonic MIM nanostructures arranged in a first sub-pixel and a second sub-pixel, in accordance with some embodiments of the invention.

For the purpose of illustration and not limitation, the cross-sectional view of FIG. 6A and the plan view of FIG. 5A show exemplary MIM antenna structures that are grouped into a first sub-pixel 310 of four MIM antenna structures 320 arrayed in a 2×2 grid and into a second sub-pixel 315 also of four MIM antenna structures 325 arrayed in a 2×2 grid. In some variations, each MIM antenna structure 320, 325 in each plasmonic sub-pixel 310, 315 may be a nanometer-sized, i.e., sub-wavelength, object typically including a nanopost or nanopillar 330, 335 separating portions made from metallic materials, e.g., platinum, gold, silver, aluminum, copper, tungsten, and combinations thereof. These metallic materials, separated by the nanopillars 330, 335, provide and/or define vertical limits for collecting and focusing incident light. Advantageously, these MIM antenna structures 320, 325, and, more specifically, the plasmonic sub-pixels 310, 315, may be configured to produce, in the presence of an analyte target molecule and when struck by incident light of a particular wavelength, an observable color change to provide presumptive evidence of the presence of the target analyte.

As shown in FIG. 6A, the exemplary pixel 350 for the sensor array 300 may include the first sub-pixel 310 comprising or consisting essentially of a first plurality of MIM antenna structures 320 and the second sub-pixel 315 comprising or consisting essentially of a second plurality of MIM antenna structures 325. For illustrative purposes, the nanopillars 330 of the MIM antenna structures 320 associated with the first sub-pixel 310 may be wider (or thicker) and arranged with a smaller or shorter periodicity than the nanopillars 335 of the MIM antenna structures 325 associated with the second sub-pixel 315. The differing diameters and periodicity between the nanopillars 330 of the MIM antenna structures 320 associated with the first sub-pixels 310 and the nanopillars 335 of the MIM antenna structures 325 associated with the second sub-pixel 315 cause the respective subpixels 310, 315 to reflect or scatter light having a different wavelength and, hence, color.

In some variations, the nanopillars of the MIM antenna structures associated with the first and second sub-pixels may be made from a MIP material, from a dielectric or insulative material (e.g., glass, SiO2, polymer, and so forth), from a dielectric material coated with a MIP material, and/or from a material comprising a blend of a MIP material and a dielectric material. In some variations, the MIP materials used in the nanopillars define cavities for attracting and adsorbing discrete analyte target molecules. Although FIG. 5A and FIG. 6A depict rectangular or substantially-rectangular nanopillars, that is done for the purpose of illustration and not limitation. Indeed, in addition to being rectangular, exemplary nanopillar cross-sections may be elliptical, circular, round, triangular, polygonal, amorphous, and the like. Typical heights for nanopillars may range between about one (1) nm and about 2000 nm, or between about 5 nm and about 1000 nm, or between about 10 nm and about 500 nm. Typical widths for nanopillars may range between about 10 nm and about 1000 nm, or between about 15 nm and about 750 nm, or between about 20 nm and about 500 nm. Typical spacing between adjacent nanopillars may range between about 10 nm and about 2000 nm, or between about 15 nm and about 1000 nm, or between about 20 nm and about 500 nm.

In some applications, the MIP material may be manufactured by polymerization as described herein. Typical monomers, cross-linkers, initiators, and/or porogens for the MIP materials of the nanopillars can be the same as those enumerated herein for the nanoposts/nanopillars and protective layer described with reference to FIGS. 1A through 1C.

A portion or portions of the MIM antenna structures may include metallic materials, e.g., platinum, gold, silver, aluminum, copper, tungsten, and combinations thereof. For example, as shown in FIG. 6A, each MIM antenna structure 320, 325 in the pixel 350 may include a thin (e.g., 0.1 nm to several hundreds of nanometers) metallic cap or nanodisk 340 that has been formed or deposited on a first (e.g., top) surface of each nanopillar 330, 335. Furthermore, a thin (e.g., 0.1 nm to several hundreds of nanometers) metallic back reflector layer, or backplane 345, may also be deposited on the base substrate 305 about a second (e.g., bottom) surface of each nanopillar 330, 335. In some embodiments, the base substrate is made of, for example, glass, plastic, metal, wood, rubber, wool, cellulose, combinations thereof, and the like. In some variations, the coupling distance between the upper surface of the metallic backplane and the bottoms of the nanodisks is about one (1) nm to about 2000 nm, or about 5 nm to about 1000 nm, or about 10 nm to about 500 nm.

The metallic backplane and nanodisks formed or disposed atop, respectively, each of the base substrate and the nanopillars provide vertical limits for collecting and focusing incident light. With only the nanodisks present, for example, the optical scattering intensity would be very low, making it difficult to observe the scattered color. By combining the nanodisks with the metallic backplane, however, plasmonic coupling between the upper and lower components may increase or enhance the scattering intensity and the hues. Advantageously, plasmonic coupling between the nanodisks and the backplane may result in a vibrant color without viewing angle dependence. Indeed, the emitted structural color due to the plasmonic coupling may differ from a structural color generated from, for example, dielectric photonic crystals with which the emitted color may depend on the viewing angle due to the light diffraction principle.

For protection and to provide a cavity with which to capture an analyte, one, two, or all of the antenna structures 320, 325, the nanodisks 340, and the backplane 345 may be encased within a protective layer 360, which can be optically transparent. In some embodiments, the protective layer is manufactured of a MIP material or of a blend of a dielectric material and a MIP material, where the MIP material is as described herein. The MIP material used for the protective layer, or blended with a dielectric material for the protective layer, may be the same or different from the MIP material used in construction of the nanopillars. Preferably, as previously described, the protective layer defines cavities produced by, e.g., removing template molecules from the MIP materials. In some variations, the cavities are shaped to receive discrete analyte target molecules.

Figure 7A:
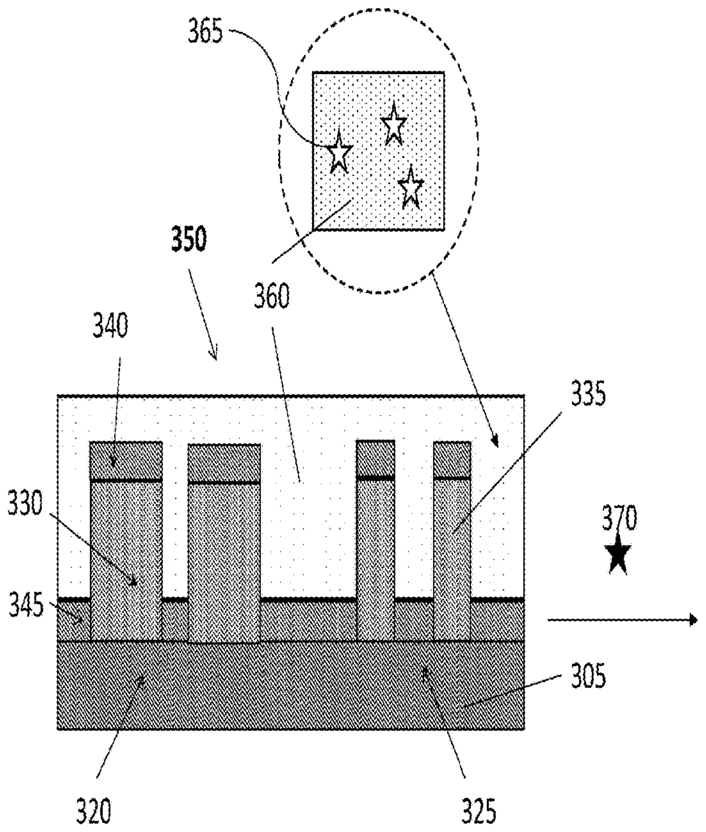
FIG. 7A schematically illustrates a cross-sectional view of the plasmonic colorimetric sensor of FIG. 6A and includes a detail of receptor cavities in a protective layer made of a MIP material encasing the nanostructures, in accordance with some embodiments of the invention.
Figure 7B:
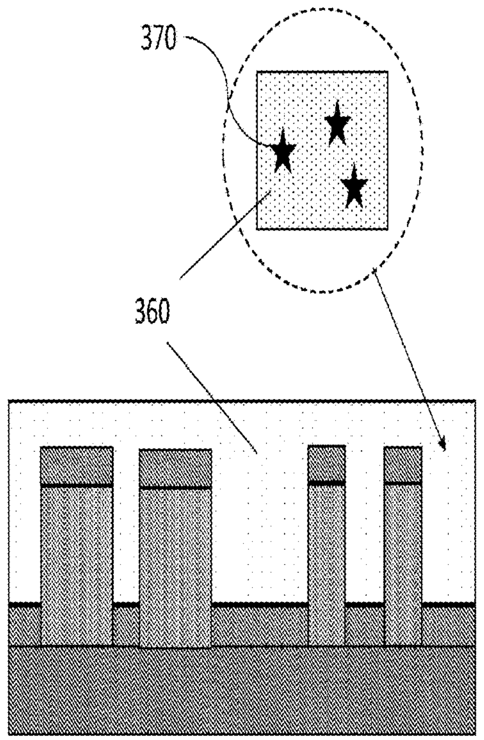
FIG. 7B schematically illustrates a cross-sectional view of the plasmonic colorimetric sensor of FIG. 7A in which the cavities are filled with an analyte target molecule, in accordance with some embodiments of the invention.

The MIP protective layer can include a chemical moiety (e.g., a "receptor" or "binding site") that can form a complex (e.g., host-guest chemistry) with an analyte target molecule of interest via a non-covalent bond, as described herein. For example, as shown in FIGS. 7A and 7B, such a receptor further can facilitate an analyte target molecule 370 positioning itself within a cavity 365 formed or disposed on or within the protective layer 360 of MIP material. The binding of analyte target molecules 370 results in an observable color change, e.g., from blue to red, within the visible light spectrum. The initial color before analyte binding may be tuned and optimized by varying the size and shape of the nanopillars, as well as by varying the periodicity of the nanopillars within each sub-pixel and between sub-pixels on the pixel.

When an analyte target molecule 370 is adsorbed into or bound to a cavity 365 of the protective layer 360 and/or of the nanopillars 330, 335, one or several changes may occur to produce the observable color change, e.g., from the color blue to the color red, as described herein.

In some implementations, the first sub-pixel may be configured to scatter, in the presence of incident light of a particular wavelength, a first color, while the second sub-pixel may be configured to scatter, in the presence of incident light of the same particular wavelength, a second color that differs from the first color, collectively giving the pixel, in the absence of an analyte target molecule, a distinctive base or background color. Advantageously, in the presence of an analyte target molecule, e.g., that is adsorbed into or bound to a cavity of the protective layer, the first and second sub-pixels each scatter a different color from before, which mix differently and cause the pixel and the sensor to emit an observable second color that differs from the base color. It is this color change in the pixel, from the base color to the second color, that is indicative of the presence of the analyte target molecule, e.g., within a fluid sample.

In operation, at a microscopic (e.g., nanometer) level, each sub-pixel of the pixel may be adapted to emit a desired, e.g., constituent, color. For example, under certain circumstances, the first sub-pixel may be structured and arranged to emit a first constituent color, e.g., magenta (M), while the second sub-pixel may be structured and arranged to emit a different, second constituent color, e.g., yellow (Y). Those of ordinary skill in the art can appreciate that the pixel may include additional sub-pixels emitting additional constituent colors, e.g., cyan (C) and the like. Moreover, blank sub-pixels may be added to provide a black (K) color.

In a first mode of operation, i.e., before analyte target molecules are captured and/or bound in cavities formed in the MIP material of the protective layer and/or of the nanopillars of the sub-pixels, the constituent colors of magenta (M) and yellow (Y) of each sub-pixel mix, such that the pixel emits the color red (R). If the pixel includes additional sub-pixels, e.g., sub-pixels capable of emitting cyan (C) or providing a black (K) color, the blending of the constituent colors may be controlled to emit any desired color. Advantageously, the ratio of the constituent colors M:Y can be controlled to be 1:1, or any desired ratio. When there are additional sub-pixels, the ratio, e.g., C:M:Y:K, can be controlled to provide any desired color.

At the macroscopic level (FIG. 5C), the sensor array 300, which may be measured in centimeters, may appear to the human eye as having a uniform color, e.g., red. This macroscopic, apparently uniform color results from the combination of the various colors emitted by each pixel 350 in the array 300. Each pixel 350, which may be measured in microns, emits the appropriate color for the desired combination and ratio of its sub-pixels 310, 315, which may be measured in nanometers.

In a second mode of operation, i.e., once a fluid containing an analyte of interest is introduced to the sensor array and, more particularly, to the protective layer or to either or both of the sub-pixels whose nanopillars include a MIP material, the presence of and binding of an analyte target molecule in any of the cavities formed in MIP material may cause a color transformation. Indeed, in this second mode of operation, introduction and capture (or binding) of an analyte target molecule within one or more cavities in the MIP of the protective layer and/or of the nanopillars, modifies the local environment of the MIP material, producing a color shift/change at the microscopic level of any affected sub-pixel and its corresponding pixel. For example, the capture/binding of analyte target molecules within the cavities may manifest as a sub-pixel color change, for example, from constituent color M to M' or from constituent color Y to Y'. These microscopic color changes in affected sub-pixels mix to produce a consequent color change in corresponding pixel (s), which leads to a macroscopic color change in at least some portion of the sensor array.

Figure 6B:
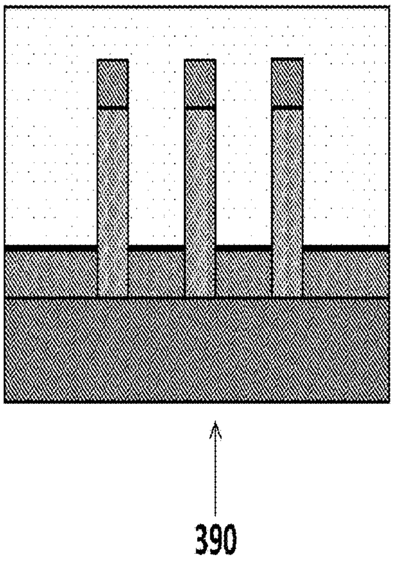
FIG. 6B schematically illustrates a cross-sectional view of another illustrative pixel of a plasmonic colorimetric sensor for use in tandem with the plasmonic colorimetric sensor of FIG. 6A, in accordance with some embodiments of the invention.
Figure 8:
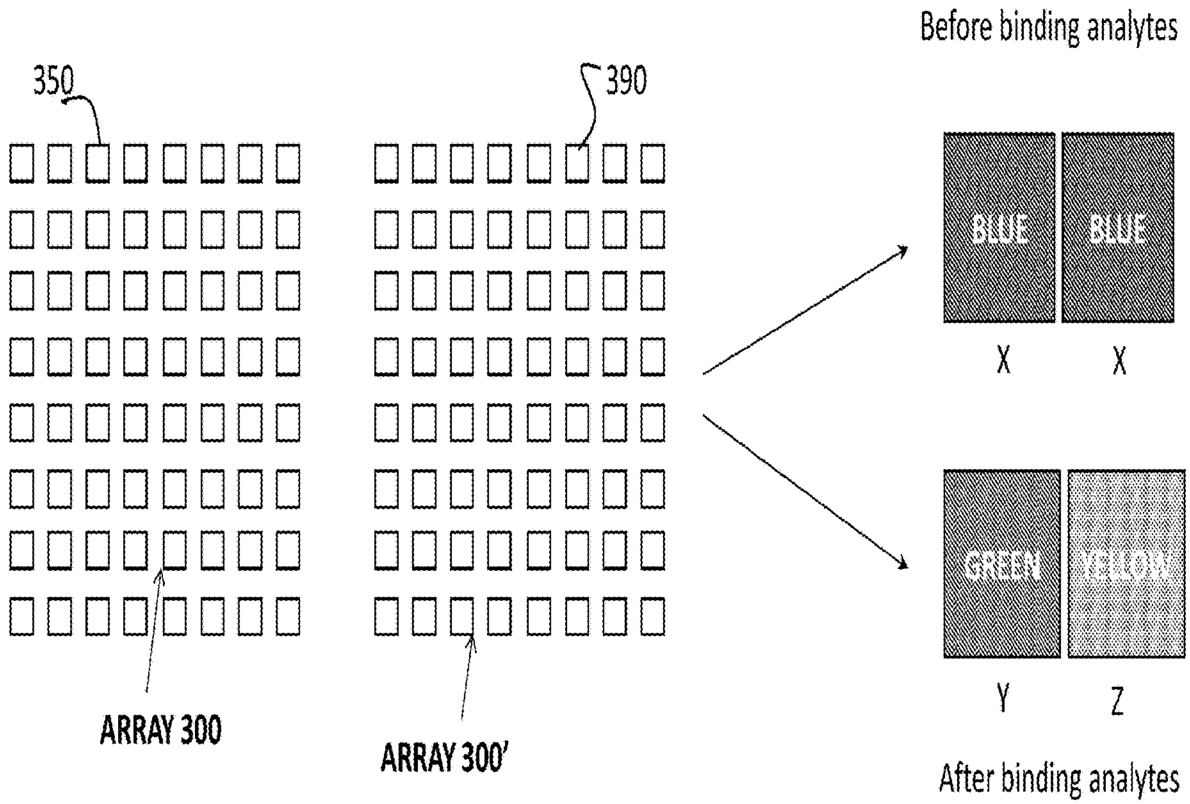
FIG. 8 schematically illustrates a dual or side-by-side sensor having a first sensor array and a second sensor array that each exhibit a change of emitted light color after the binding of an analyte target molecule to a cavity in the MIP material, in accordance with some embodiments of the invention.

In some applications, dual or multiple sensor arrays may be used in tandem to provide confirmation of results and/or a greater degree of accuracy and assurance. For example, as shown in FIG. 8, a first sensor array 300 having multiple first pixels 350 (see FIG. 6A) associated therewith and a second sensor array 300' having multiple second pixels 390 (see FIG. 6B) associated therewith may be disposed, e.g., in a tandem or side-by-side arrangement, to provide evidence of the presence of an analyte target molecule. In a first mode of operation, e.g., before any target analyte is adsorbed by, captured in, or bound to a cavity in the MIP material(s) in either of the sensor arrays, each of the arrays may emit a color X, e.g., blue, indicating that no target analyte is present. In a second mode of operation, e.g., after a target analyte is adsorbed by, captured in, or bound to a cavity in the MIP material(s) in the sensor arrays, the first array may emit a first color Y, e.g., green, indicating that a target analyte is present, while the second array may emit a second color Z, e.g., yellow, indicating that the same target analyte is present. The contrast between the first color Y and the second color Z provides further visual confirmation that the analyte target molecule is present. Those of ordinary skill in the art can appreciate that in the design of the sub-pixels and pixels of each sensor array, the size, shape, and periodicity of the MIM antenna structures can be structured and arranged to produce the first color Y and the second color Z, respectively, when the analyte target molecule is present.

In addition, in various embodiments, the MIPs described herein can define multiple cavities for multiple, different analytes, such that a single one of the sensors described herein can detect the presence of multiple, different analytes. Alternatively, in certain embodiments, a sensor described herein may be configured to detect the presence of only a single analyte, but multiple ones of such sensors may be used in tandem such that, together, the sensors can detect the presence of multiple, different analytes.

Additional Testing

Detection of a color change using any of the sensors or sensor arrays described herein provides a presumption of the presence of the analyte target molecule of interest. Further verification is possible by subjecting the sample to additional testing that does not lend itself to use in the field. For example, surface-enhanced Raman scattering (SERS) is a spectroscopic method used in chemical and/or biological sensing for the purpose of detecting individual molecules, e.g., analyte target molecules. More specifically, Raman scattering, using a spectrometer capable of detecting a molecular vibrational spectrum, is predicated on the notion that any molecule of each analyte target will have a unique Raman scattering spectrum, displaying, upon illumination, e.g., by a laser light-emitting device, discrete, specific (Raman) peaks that can be collected and used to identify or confirm the presence of the analyte target molecule with a high degree of accuracy.

Methods of Manufacture

The colorimetric sensors described herein may be manufactured in a variety of manners. Exemplary top-down methods of manufacture are described below.

Top-Down Methods of Manufacture

Referring to FIGS. 9A through 9F, an exemplary top-down method to produce the sensor of FIGS. 1A through 1C is shown. In a first step (FIGS. 9A and 9B), a thin layer of a material 90 may be applied to, coated on, or formed on the surface of a substrate 92. In some implementations, the thin layer of material 90 may be made of, for example, a molecularly imprinted polymer (MIP) material, a dielectric or insulative material (e.g., glass, SiO2, polymer, and so forth), and/or a material comprising a blend of one or more MIP materials and a dielectric material. The substrate may be made of, for example, glass, plastic, metal, wood, rubber, wool, cellulose, combinations thereof, and the like. In some embodiments, the thin layer of material is spin-coated onto the substrate. The thin layer of material 90 may be thick enough to result (following the imprinting step described below) in nanoposts/nanopillars 25 having a height that falls within a range between about 1 nm and about 2000 nm, or between about 5 nm and about 1000 nm, or between about 10 nm and about 500 nm. For example, the starting thickness of the thin layer of material may be slightly greater than the desired finishing height of the resulting nanoposts/nanopillars.

Figures 9A, 9B, 9C, 9D, 9E, 9F:
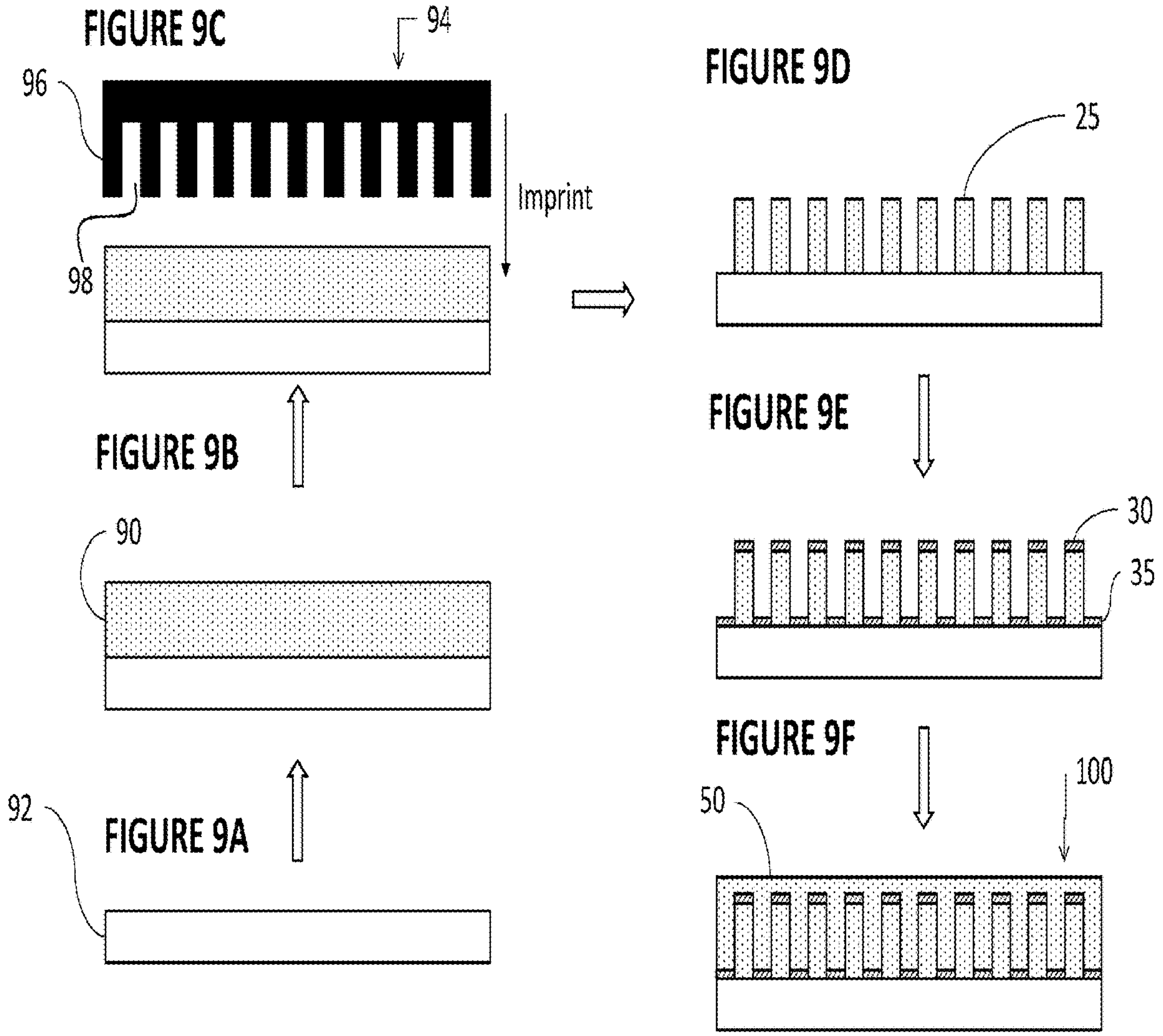
FIGS. 9A through 9F schematically illustrate a top-down method of manufacturing the plasmonic colorimetric sensor of FIGS. 1A through 1C, in accordance with some embodiments of the invention.
Figure 10A:
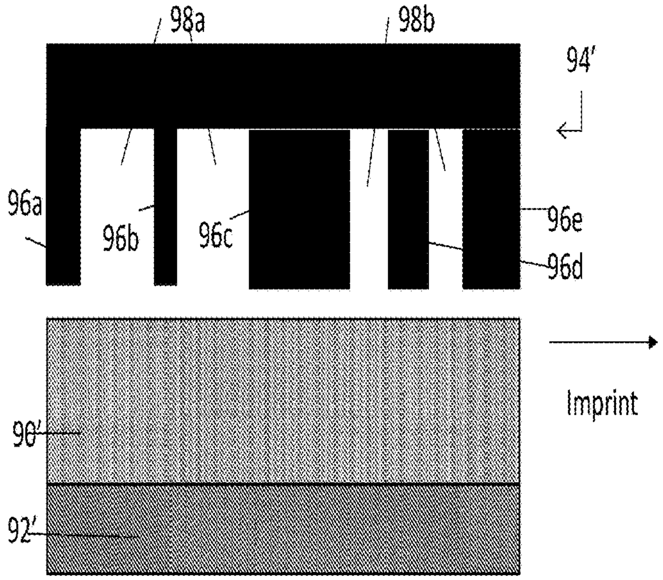
FIGS. 10A through 10C schematically illustrate certain steps of a top-down method of manufacturing the plasmonic colorimetric sensor of FIG. 6A, in accordance with some embodiments of the invention.
Figure 10B:
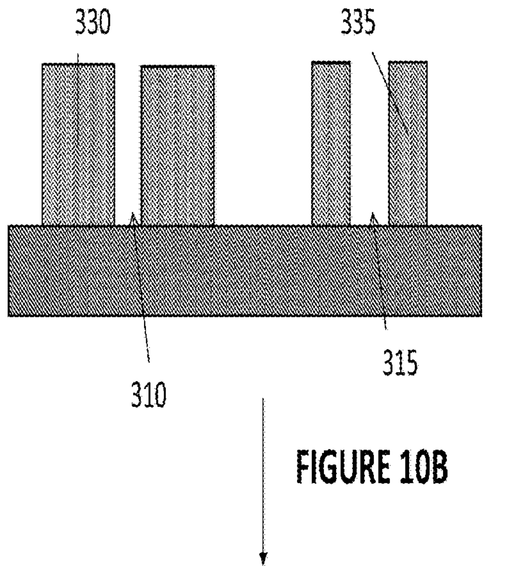
Figure 10C:
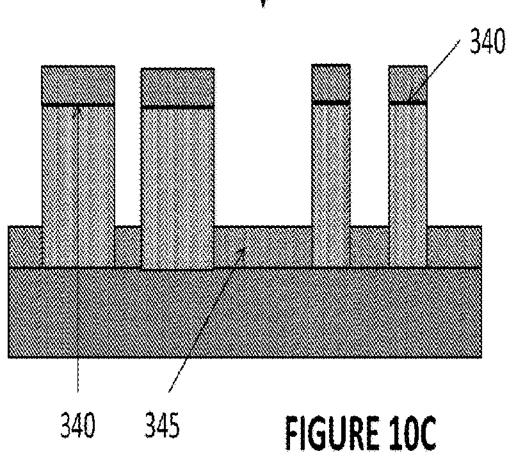

In a next step (FIGS. 9C and 9D), the thin layer of material 90 may be imprinted by a mold 94, e.g., made of silicone or some other suitable mold material such as silicon (Si), polyethylene terephthalate (PET), a UV-curable resin, and the like. In some implementations, the mold 94 may include solid portions 96 and openings 98 that are structured and arranged to provide a negative or mirrored image of the desired array of nanoposts, nanopillars, or the like. The design of the solid portion 96 and openings 98 may be configured to provide the resulting array 100 or nanoposts, nanopillars 25, or the like with a desired periodicity. Although the shapes and sizes of the solid portions 96 and of the openings 98 in the mold 94 shown in FIG. 9C are the same or substantially the same, those of ordinary skill in the art can appreciate that the solid portions 96 and openings 98 of the mold 94 may be manufactured to provide nanoposts, nanopillars, or the like of any desired shape with any desired dimensions and at any desired periodicity. Typical heights of the resulting nanoposts/nanopillars may range between about one (1) nm and about 2000 nm, or between about 5 nm and about 1000 nm, or between about 10 nm and about 500 nm. The periodicity of the post array may range between about 10 nm and about 2000 nm, or between about 15 nm and about 1000 nm, or between about 20 nm and about 500 nm. The diameter of cylindrical nanopost/nanopillars may range between about 10 nm and about 1000 nm, or between about 15 nm and about 750 nm, or between about 20 nm and about 500 nm.

In some variations, prior to imprinting the layer, a very thin layer or coating of a releasing agent, e.g., fluorocarbon, fluorosilane, polybenzoxazine, combinations thereof, and the like, may be applied to the surfaces of the solid portions of the mold, to facilitate removal of the mold from the resulting array of nanoposts/nanopillars. The very thin layer or coating of the releasing agent can be a self-assembled monolayer (SAM) or multiple layers with a thickness from less than about one (1) Angstrom to about 10 nm.

Following the imprinting of the nanoposts/nanopillars, they may be cured via photo—(e.g., using ultraviolet (UV) light) or thermal-initiated polymerization. In the case where the nanoposts/nanopillars are dielectric materials to be coated with a MIP material, a thin (e.g., 0.1 nm to 100 nm thick) adhesion layer of silica may be applied (e.g., via chemical vapor deposition (CVD), physical vapor deposition (PVD), electron beam evaporation, or sputtering) to the exterior surfaces of the nanoposts/nanopillars 25 shown in FIG. 9D. Then, a soluble and processible MIP may be applied (e.g., via spin-coating or dip-coating) to the silica surface as a thin (e.g., 0.1 nm to 100 nm thick) coating prior to the metal deposition depicted in FIG. 9E.

In a next step (FIG. 9E), a thin layer (e.g., of about 0.1 nm to several hundred nanometers) of metal, e.g., platinum, gold, silver, aluminium, copper, tungsten, combinations thereof, and the like, may be deposited, e.g., by metal deposition, chemical vapor deposition (CVD), sputtering, three-dimensional nanoprinting, plasma-enhanced chemical vapor deposition (PECVD), physical vapor deposition (PVD), electroless plating, and so forth, on the surface of the substrate 92 and on a top surface of the nanoposts/nanopillars 25 in the array. Deposition on the surface of the substrate 92 may form a continuous metal film 35 with openings (e.g., holes), while deposition on the top surfaces of the nanoposts/nanopillars 25 forms metal nanodisks 30.

In a next step (FIG. 9F), the nanoposts/nanopillars 25, nanodisks 30, and continuous metal film 35 may be coated with an optically transparent protective layer 50 to protect the sensor array from abrasion and scratching. In some variations, the protective layer may be made of one or more MIP materials or, alternatively, one or more MIP materials blended with one or more dielectric materials. The blend may range from about 1% MIP materials/99% dielectric materials to about 99% MIP materials/1% dielectric materials. Advantageously, as previously explained, the protective layer may include a plurality of cavities and serve as the analyte target molecule capturing agent for the sensor array. Accordingly, in some embodiments, a greater percentage of MIP materials is preferable in the blend, as it provides for a greater number of cavities to capture the analytes of interest. For example, the blend may include 60% MIP materials, 70% MIP materials, 80% MIP materials, 90% MIP materials, 95% MIP materials, or more. In some embodiments, the protective layer is applied by spin-coating and is photo- or thermally-initiated for polymerization.

FIGS. 1OA through 1OC illustrate the use of an exemplary mold 94' in a top-down manufacturing method to produce the sensor of FIG. 6A. The steps for producing the nanoposts/nanopillars 330, 335 for each of the sub-pixels 310, 315 in the sensor array 300 may be essentially the same as those previously described in connection with FIGS. 9A through 9F. The molds 94, 94', however, differ. More particularly, in some applications, the mold 94' for producing the nanoposts/nanopillars 330, 335 for each of the sub-pixels 310, 315 in the sensor array 300 may include solid portions 96*a*-96*e* and openings 98*a* and 98*b* having non-uniform dimensions, so as to produce a first sub-pixel 310 with wider (i.e., thicker), more closely-spaced nanoposts/nanopillars 330 and a second sub-pixel 315 with thinner, less densely-spaced nanoposts/nanopillars 335.

Referring to FIGURES I IA through I IE, an exemplary top-down method to produce the nanosphere sensor array 200 of FIG. 2 is shown. In a first step (FIGURES I IA and 1 IB), colloidal nanospheres 115 made of, for example, a molecularly imprinted polymer (MIP) material, a dielectric or insulative material (e.g., glass, SiO2, polymer, and so forth), and/or a material comprising a blend of one or more MIP materials and a dielectric material, may be formed or self-assembled, e.g., as a closely packed monolayer, on the surface of a substrate 110. As before, the substrate may be made of, for example, glass, plastic, metal, wood, rubber, wool, cellulose, combinations thereof, and the like. The diameters of the nanospheres may range between about IO nm and about 3000 nm, or between about 20 nm and about 2000 nm, or between about 30 nm and about 1000 nm. In some embodiments, the nanospheres are formed as a monolayer on the substrate via dip-coating or spin-coating of colloidal nanospheres.

In a next step (FIGURE I IC), the nanospheres 115 may be shrunk, e.g., by an oxygen plasma process or the like, until the diameters of the shrunken nanospheres 115' are between about 1 nm and about 2000 nm, or between about 5 nm and about 1000 nm, or between about 10 nm and about 500 nm. For example, the closely-packed nanosphere array may be subject to oxygen plasma etching so that the diameter of the nanospheres becomes smaller due to the etching process.

Figure 11B:
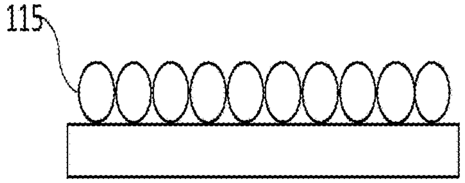
FIGS. 11A through 11E schematically illustrate a top-down method of manufacturing the plasmonic colorimetric sensor of FIG. 2, in accordance with some embodiments of the invention.
Figure 11C:
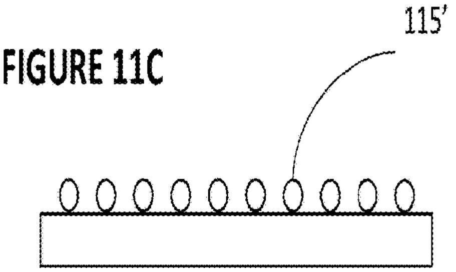
Figure 11A:
Figure 11D:
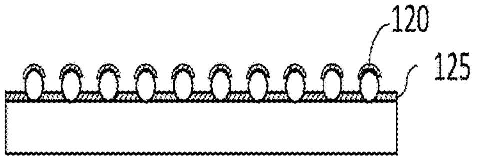

In a next step (FIG. 11D), a thin layer (e.g., of about 0.1 nm to several hundred nanometers) of metal, e.g., platinum, gold, silver, aluminium, copper, tungsten, combinations thereof, and the like, may be deposited, e.g., by metal deposition, chemical vapor deposition (CVD), sputtering, three-dimensional nanoprinting, plasma-enhanced chemical vapor deposition (PECVD), physical vapor deposition (PVD), electroless plating, and so forth, on the surface of the substrate 110 and on or at the crowns of the nanospheres 115'. Deposition on the surface of the substrate 110 may form a continuous metal film 125 with openings (e.g., holes) about the nanospheres 115', while deposition on the top surfaces of the nanospheres 115' forms metal caps 120.

Figure 11E:
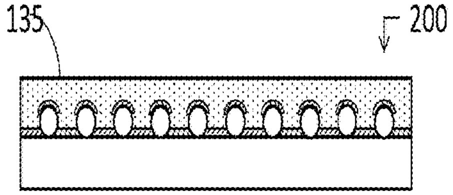

In a next step (FIG. 11E), the continuous metal film 125, metal caps 120, and arranged nanospheres 115' may be coated with an optically transparent protective layer 135 to protect the sensor array from abrasion and scratching. In some variations, the protective layer may be made of one or more MIP materials. Alternatively, the protective layer may be made of one or more MIP materials blended with one or more dielectric materials. The blend may range from about 1% MIP materials/99% dielectric materials to about 99% MIP materials/1% dielectric materials. Advantageously, as previously explained, the MIP protective layer may also define a plurality of cavities for capturing analyte target molecules of interest. Accordingly, in some embodiments, a greater percentage of MIP materials is preferable in the blend, as it provides for a greater number of cavities to capture the analytes of interest. For example, the blend may include 60% MIP materials, 70% MIP materials, 80% MIP materials, 90% MIP materials, 95% MIP materials, or more. In one embodiment, the protective layer 135 is applied by spin-coating and is photo or thermally initiated for polymerization.

Practice of the invention will be more fully understood from the following example, which is presented herein for illustrative purposes only, and should not be construed as limiting the invention in any way.

EXAMPLE

Figure 12:
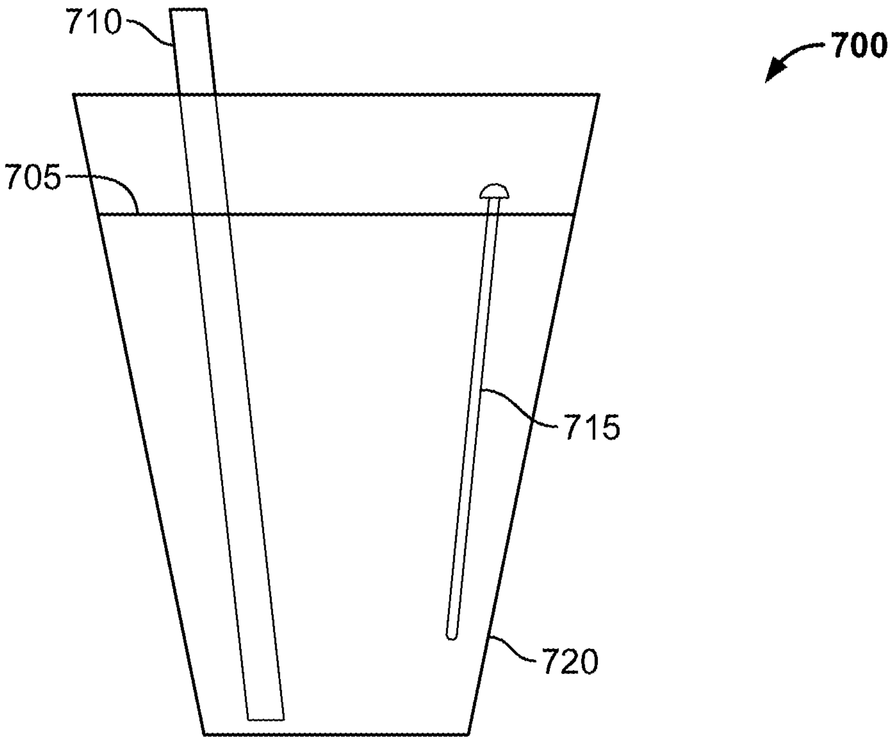
FIG. 12 schematically illustrates exemplary structures for use in combination with colorimetric sensors for detecting an analyte target molecule of interest in a fluid sample, in accordance with some embodiments of the invention.

In various embodiments, for example referring to FIG. 12, any of the sensors or sensor arrays described herein may be operatively disposed upon or integrated within a surface of a substrate 700. In its normal or customary use, the substrate 700, the surface thereof, and the sensor or sensor array disposed upon or integrated within that surface are exposed to a liquid 705 in which an analyte target molecule of interest may or may not be present. For the purpose of illustration and not limitation, exemplary substrates 700 include a straw 710, a swizzle stick or stirrer 715, a fluid receptacle 720 (e.g., a cup, a glass, and the like), and so forth.

In a first step, a fluid sample to be interrogated, e.g., a beverage, is brought into contact with the sensor or sensor array. This may occur, for example, by pouring the beverage into a fluid receptacle into which the sensor or sensor array has been integrated; by inserting a straw, stirrer, or swizzle stick into which the sensor or sensor array has been integrated into the beverage; and so forth. In some applications, visual indicia of the sensor or sensor array after initial contact with the beverage may provide a neutral or "safe" reading, e.g., the sensor or sensor array may emit blue light. If an analyte of interest is introduced into the beverage, a color change in the sensor or sensor array, e.g., from blue to red, indicates that analyte is present in the fluid sample. Thus, in a second step, the sensor or sensor array produces a color change when it comes into contact with the beverage. Advantageously, the sensor or sensor array may be able to detect the presence of an analyte of interest for an extended period of time, such that a single sensor or sensor array may be used to continue to detect for hours whether or not an analyte of interest is present in the beverage.

INCORPORATION BY REFERENCE

The entire disclosures of each of the patent documents and scientific articles cited herein are incorporated by reference herein in their entirety for all purposes.

EQUIVALENTS

The invention may be embodied in other specific forms without departing from the spirit or essential characteristics thereof. The foregoing embodiments are therefore to be considered in all respects illustrative rather than limiting on the invention described herein. Scope of the invention is thus indicated by the appended claims rather than by the foregoing description, and all changes that come within the meaning and range of equivalency of the claims are intended to be embraced therein.

What is claimed is:

1. A method of manufacturing a colorimetric sensor for detecting an analyte of interest, the method comprising:
- forming, for a sensor, a plurality of nanostructures on a substrate, wherein forming the plurality of nanostructures on the substrate comprises selecting one of a size, a shape, and a periodicity of the plurality of nanostructures;
- applying a metal to at least a portion of the plurality of nanostructures and to at least a portion of the substrate to create a first color on the at least the portion of the substrate;
- covering at least one of the plurality of nanostructures and the metal with a first layer of receptors to receive an analyte of interest; and configuring the sensor such that, when the analyte of interest binds to the first layer of receptors, an optical property of at least a portion of the sensor changes to cause a detectable color change of the first color in the at least the portion of the sensor to create a second color on the substrate, wherein forming the plurality of nanostructures on the substrate comprises one of:

coating a surface of the substrate with a coating of at least one of a dielectric material, a second layer of receptors, or a blend of the dielectric material and the second layer of receptors, and imprinting the plurality of nanostructures in the coating; and self-assembling a layer of nanostructures on the surface of the substrate.

2. The method of claim 1, wherein one of the first layer of receptors and the second layer of receptors includes a molecularly imprinted polymer.

3. The method of claim 1, wherein the coating comprises a thickness between about 1 nanometer and about 2 micrometers.

4. The method of claim 1, wherein the plurality of nanostructures are imprinted using a mold.

5. The method of claim 4, wherein the mold is coated with a release agent.

6. The method of claim 5, wherein the release agent comprises at least one of a fluorocarbon release agent, a fluorosilane release agent, a polybenzoxazine release agent, or combinations thereof.

7. The method of claim 1, wherein at least some of the plurality of nanostructures are nanoposts.

8. The method of claim 1, wherein at least some of the plurality of nanostructures are nanospheres.

9. The method of claim 8, wherein forming the plurality of nanostructures on the substrate further comprises shrinking the nanospheres.

10. The method of claim 9, wherein the nanospheres are shrunk by an oxygen plasma process.

11. The method of claim 9, wherein at least a portion of the nanospheres that are shrunk comprise a diameter between about 1 nanometer and about 2 micrometers.

12. The method of claim 8, wherein at least a portion of the nanospheres comprises the at least one of the dielectric material, the second layer of receptors, and the blend of a second dielectric material and the second layer of receptor.

13. The method of claim 1, wherein the plurality of nanostructures comprises a periodic distribution from about 10 nanometers to about 2 micrometers.

14. The method of claim 1, wherein the plurality of nanostructures comprises a first subset of nanostructures configured as a first sub-pixel to produce a first color and a second subset of nanostructures configured as a second sub-pixel to produce a second color.

15. The method of claim 14, wherein the plurality of nanostructures of the first subset of nanostructures comprises dimensions different from the plurality of nanostructures of the second subset of nanostructures.

16. The method of claim 14, wherein the plurality of nanostructures of the first subset of nanostructures comprises a periodicity different from the plurality of nanostructures of the second subset of nanostructures.

17. The method of claim 1, wherein the substrate comprises at least one of glass, plastic, metal, rubber, wood, cellulose, wool, or combinations thereof.

18. The method of claim 1, wherein the substrate is one of a fluid receptacle, a stirrer, and a straw.

19. The method of claim 18, wherein the fluid receptacle is one of a cup and a glass.

20. The method of claim 1, wherein the metal is applied by a metal deposition process.

21. The method of claim 1, wherein the metal comprises at least one of aluminum, copper, silver, gold, platinum, tungsten, or combinations thereof.

22. The method of claim 1, wherein the first layer of receptors is a molecularly imprinted polymer layer that is optically transparent.

23. The method of claim 1, wherein the first layer of receptors includes a binding site that forms a complex with the analyte of interest.

24. The method of claim 1 further comprising creating a plurality of holes after applying the metal to the at least the portion of the substrate.

25. The method of claim 1, wherein the first layer of receptors includes a moiety forming a host-guest chemistry with the analyte of interest.

* * * * *